US012615640B2

(12) United States Patent
Choi et al.

(10) Patent No.: US 12,615,640 B2
(45) Date of Patent: Apr. 28, 2026

(54) APPARATUS AND METHOD FOR TRANSMITTING CONTROL CHANNEL IN WIRELESS COMMUNICATION SYSTEM

(71) Applicant: SAMSUNG ELECTRONICS CO., LTD., Suwon-si (KR)

(72) Inventors: Youngkwan Choi, Suwon-si (KR); Yeongsam Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 18/208,637

(22) Filed: Jun. 12, 2023

(65) Prior Publication Data

US 2023/0328736 A1 Oct. 12, 2023

Related U.S. Application Data

(63) Continuation of application No. PCT/KR2022/000489, filed on Jan. 11, 2022.

(30) Foreign Application Priority Data

Jan. 11, 2021 (KR) ........................ 10-2021-0003546

(51) Int. Cl.
*H04W 72/21* (2023.01)
*H04L 25/03* (2006.01)
*H04W 72/12* (2023.01)

(52) U.S. Cl.
CPC ....... *H04W 72/21* (2023.01); *H04L 25/03343* (2013.01); *H04W 72/12* (2013.01)

(58) Field of Classification Search
None
See application file for complete search history.

(56) References Cited

U.S. PATENT DOCUMENTS 8,374,072 B2 2/2013 Gaal et al.
9,730,199 B2 8/2017 Seo et al.
(Continued)

FOREIGN PATENT DOCUMENTS

CN 106789827 B 8/2018
EP 2 530 895 A1 12/2012
(Continued)

OTHER PUBLICATIONS

International Search Report (PCT/ISA/210) issued Apr. 29, 2022 by the International Searching Authority in counterpart International Patent application No. PCT/KR2022/000489.
(Continued)

*Primary Examiner* — Hassan A Phillips
*Assistant Examiner* — Gautam Sharma
(74) *Attorney, Agent, or Firm* — Sughrue Mion, PLLC

(57) ABSTRACT

Embodiments of the present disclosure relate to control channel transmission in a wireless communication system thereof are provided. The method, executed by a processor in user equipment (UE) or a base station (BS), may include acquiring information bits for uplink control information; acquiring a transmission bitstream, the transmission bitstream being based on channel coding and scrambling for the information bits; generating a transmission complex sequence corresponding to the transmission bitstream, the transmission complex sequence being from among a plurality of complex sequences; and transmitting a signal of the transmission complex sequence to a base station (BS) through a physical uplink control channel (PUCCH), wherein each of the plurality of complex sequences is based on a respective Zadoff-Chu (ZC) sequence, and a respective length of the ZC sequence is larger than a number of candidate values of the transmission bitstream.

20 Claims, 10 Drawing Sheets

(56) References Cited

U.S. PATENT DOCUMENTS

| | | | |
|---|---|---|---|
| 9,762,357 B2 | 9/2017 | Maattanen et al. | |
| 10,064,169 B2 | 8/2018 | Bai et al. | |
| 10,375,734 B2* | 8/2019 | Suzuki | H04J 13/22 |
| 10,523,395 B2 | 12/2019 | Kim et al. | |
| 10,560,229 B2 | 2/2020 | Xiong et al. | |
| 10,820,353 B2* | 10/2020 | Lin | H04J 13/0062 |
| 11,018,830 B2 | 5/2021 | Hu et al. | |
| 11,621,810 B2* | 4/2023 | Liang | H04J 11/005 |
| | | | 370/329 |
| 11,817,942 B2 | 11/2023 | Canonici | |
| 2008/0232486 A1* | 9/2008 | Kowalski | H04L 27/2613 |
| | | | 375/260 |
| 2009/0052427 A1* | 2/2009 | Oketani | H04L 5/0007 |
| | | | 370/347 |
| 2009/0325513 A1* | 12/2009 | Iwai | H04J 13/0062 |
| | | | 455/91 |
| 2015/0009883 A1 | 1/2015 | Bai et al. | |
| 2016/0269939 A1* | 9/2016 | Papasakellariou | H04L 1/189 |
| 2017/0214495 A1 | 7/2017 | Golitschek Edler von Elbwart et al. | |
| 2017/0264399 A1 | 9/2017 | Li et al. | |
| 2018/0076917 A1 | 3/2018 | Pan et al. | |
| 2018/0124733 A1* | 5/2018 | Vilaipornsawai | H04W 52/0229 |
| 2018/0213382 A1* | 7/2018 | Tabet | H04W 8/005 |
| 2018/0324787 A1 | 11/2018 | Yin et al. | |
| 2019/0044598 A1* | 2/2019 | Talarico | H04L 5/001 |
| 2019/0274168 A1* | 9/2019 | Hwang | H04W 74/004 |
| 2019/0327053 A1* | 10/2019 | Hu | H04L 5/00 |
| 2020/0067621 A1 | 2/2020 | Hu et al. | |
| 2020/0106583 A1* | 4/2020 | Zirwas | H04L 5/0051 |
| 2020/0187269 A1 | 6/2020 | Tabet et al. | |
| 2022/0021434 A1* | 1/2022 | Huang | H04J 13/12 |
| 2022/0149966 A1 | 5/2022 | Canonici | |
| 2024/0251410 A1* | 7/2024 | Liu | H04L 5/0082 |

FOREIGN PATENT DOCUMENTS

| | | |
|---|---|---|
| EP | 3 681 061 A1 | 7/2020 |
| KR | 10-2008-0065562 A | 7/2008 |
| KR | 10-2018-0018504 A | 2/2018 |
| KR | 10-2020-0044989 A | 4/2020 |
| WO | 2017/146751 A1 | 8/2017 |
| WO | 2020/174167 A1 | 9/2020 |

OTHER PUBLICATIONS

Written Opinion (PCT/ISA/237) issued Apr. 29, 2022 by the International Searching Authority in counterpart International Patent application No. PCT/KR2022/000489.

Communication issued Mar. 19, 2024 by the European Patent Office in European Patent Application No. 22736934.5.

Communication issued Jul. 24, 2025 by the Korean Intellectual Property Office in Korean Patent Application No. 10-2021-0003546.

Communication dated Jan. 19, 2026, issued by the European Patent Office in European Application No. 22736934.5.

Communication dated Mar. 12, 2026, issued by the Korean Ministry of Intellectual Property in Korean Application No. 10-2021-0003546.

* cited by examiner

APPARATUS AND METHOD FOR TRANSMITTING CONTROL CHANNEL IN WIRELESS COMMUNICATION SYSTEM

CROSS-REFERENCES TO RELATED APPLICATIONS

This application is a bypass continuation of International Application No. PCT/KR2022/000489, filed on Jan. 11, 2022, which claims priority from Korean Patent Application No. 10-2021-0003546, filed on Jan. 11, 2021, in the Korean Intellectual Property Office, the disclosures of which are incorporated herein by reference in their entireties.

BACKGROUND

1. Field

The disclosure generally relates to a wireless communication system and, more particularly, to an apparatus and a method for transmitting a control channel in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In a wireless communication system, a user equipment (UE) may transfer uplink control information (UCI) to a base station (BS). Various formats of a control channel for transmitting uplink control information are defined in the standard. At this time, some physical uplink control channel (PUCCH) formats defined for one symbol or two symbols have relatively small coverage due to low power.

SUMMARY

On the basis of the discussion, the disclosure provides an apparatus and a method for a new physical uplink control channel (PUCCH) to increase the cell coverage during control channel transmission in a wireless communication system.

The disclosure provides an apparatus and a method for performing modulation using a Zadoff-Chu (ZC) sequence to decrease an error probability during physical layer processing in a wireless communication system.

The disclosure provides an apparatus and a method for signaling configuration information related to ZC sequence-based modulation in a wireless communication system.

According to various embodiments of the disclosure, a method for control channel transmission in a wireless communication system, the method being performed by UE in a wireless communication system includes acquiring information bits for uplink control information; acquiring a transmission bitstream, the transmission bitstream being based on channel coding and scrambling for the information bits; generating a transmission complex sequence corresponding to the transmission bitstream, the transmission complex sequence being from among a plurality of complex sequences; and transmitting a signal of the transmission complex sequence to a base station (BS) through a physical uplink control channel (PUCCH), wherein each of the plurality of complex sequences is based on a respective Zadoff-Chu (ZC) sequence, and a respective length of the ZC sequence is larger than a number of candidate values of the transmission bitstream.

According to various embodiments of the disclosure, a UE in a wireless communication system includes at least one transceiver, and at least one processor, and the at least one processor is configured to acquire information bits for uplink control information; acquire a transmission bitstream, the transmission bitstream being based on channel coding and scrambling for the information bits; generate a transmission complex sequence corresponding to the transmission bitstream, the transmission complex sequence being from among a plurality of complex sequences; and transmit a signal of the transmission complex sequence to a base station (BS) through a physical uplink control channel (PUCCH), wherein each of the plurality of complex sequences is based on a respective Zadoff-Chu (ZC) sequence, and a respective length of the ZC sequence is larger than a number of candidate values of the transmission bitstream.

According to various embodiments of the disclosure, a method performed by a BS in a wireless communication system includes receiving a signal from a user equipment (UE) through a physical uplink control channel (PUCCH); acquiring a transmission complex sequence of the signal among a plurality of complex sequences; and acquiring information bits for uplink control information by descrambling and decoding a transmission bitstream corresponding to the transmission complex sequence, wherein each of the plurality of complex sequences is based on a respective Zadoff-Chu (ZC) sequence, and a respective length of the ZC sequence is larger than a number of candidate values of the transmission bitstream.

According to various embodiments of the disclosure, a BS in a wireless communication system includes at least one transceiver and at least one processor, and the at least one processor may be configured to receive a signal from a user equipment (UE) through a physical uplink control channel (PUCCH); acquire a transmission complex sequence of the signal among a plurality of complex sequences; and acquire information bits for uplink control information by descrambling and decoding a transmission bitstream corresponding to the transmission complex sequence, wherein each of the plurality of complex sequences is based on a respective Zadoff-Chu (ZC) sequence, and a respective length of the ZC sequence is larger than a number of candidate values of the transmission bitstream.

An apparatus and a method according to various embodiments of the disclosure can generate a ZC sequence corresponding to a bitstream to improve the cell coverage in control information transmission through a PUCCH.

An apparatus and a method according to various embodiments of the disclosure can define a new PUCCH format for a Zadoff-Chu (ZC) sequence to allow the UE to effectively transfer control information to the BS.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION

Figure 1:
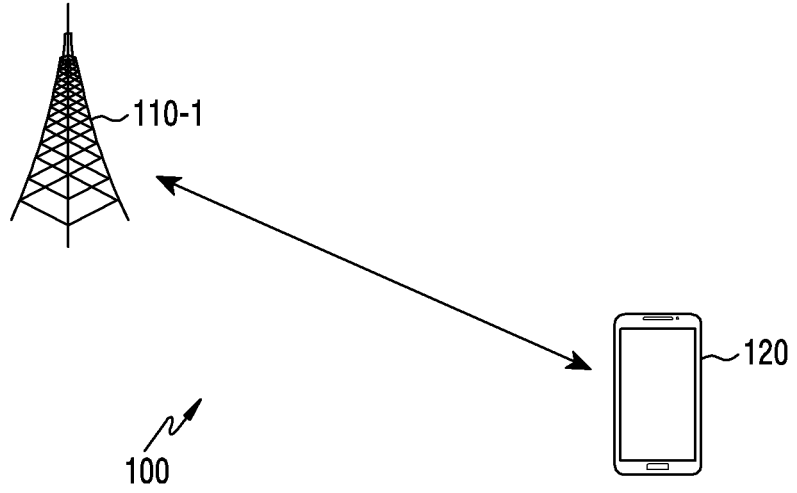
FIG. 1 illustrates an example of a radio communication environment according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for transmitting a control channel in a wireless communication system. Specifically, the disclosure describes a scheme and a new format for more effectively designing a PUCCH corresponding to a control channel, and a procedure of a transmission end or a reception end according thereto when uplink control information is transmitted in a wireless communication system, and also a scheme for combining the same with the conventional operation to adaptively use the combination.

The terms (for example, encoding/decoding, channel coding, scrambling, modulation, IFFT/FFT, cyclic prefix (CP) insertion/deletion) related to signal processing used in the following description is described on the basis of the terms defined in the LTE or NR standard of the current 3GPP, but other terms having the equivalent technical meaning may be used. The terms (for example, a format name and a parameter name) referring to parameters used in the following description, the terms (for example, K, 1, and the like) referring to parameters, the term (for example, an uplink control channel) referring to a channel, the terms referring to control information (for example, uplink control information, a scheduling request (SR), and hybrid automatic repetition request acknowledge (HARQ-ACK), and the terms (for example, a transmission device, reception device, a transmission end, a reception end, a BS, a UE, a communication node, a radio node, a radio unit, a network node, a master node (MN), a secondary node (SN), a transmission/reception point (TRP), a digital unit (DU), a radio unit (RU), and a massive MIMO unit (MMU)) referring to network entities are presented for convenience of the description. Accordingly, the disclosure is not limited to those terms, and other terms having the same technical meanings may be used.

In the disclosure, various embodiments will be described using terms employed in some communication standards (e.g., long term evolution (LTE) and new radio (NR) defined by the 3rd generation partnership project (3GPP)), but they are only for the sake of illustration. The embodiments of the disclosure may also be easily applied to other communication systems through modifications.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

FIG. 1 illustrates an example of a radio communication environment according to various embodiments of the disclosure. Referring to FIG. 1, a BS 110 and a UE 120 are illustrated as parts of nodes using a radio channel in a wireless communication system. The UE 120 may be connected to a plurality of BSs. Although not illustrated, BSs may be connected to the UE 120 through multiple connectivity (for example, dual connectivity (DC)).

The BS 110 is a network infrastructure element that provides radio access to the UE 120. The BS 110 has coverage defined in a predetermined geographical area on the basis of the range within which a signal can be transmitted. The term 'coverage' used below may indicate a service coverage area of the BS 110. The BS 110 may cover a single cell or multiple cells. The multiple cells may be divided by a frequency supporting multiple cells or an area of a covered sector.

The BS 110 may be referred to as 'access point (AP)', 'eNodeB (eNB)', '5th-generation (5G) node', '5G NodeB (NB)', 'next generation node B (gNB)', 'wireless point', 'transmission/reception point (TRP)', 'distributed unit (DU) ', a radio unit (RU)', 'remote radio head (RRH)', or other terms having an equivalent technical meaning, as well as a base station. According to various embodiments, the BS 110 may be connected to one or more 'transmission/reception points (TRPs)'. The BS 110 may transmit a downlink signal to the UE 120 or receive an uplink signal from the UE 120 through one or more TRPs.

The UE 120 is a device used by a user and performs communication with the BS 110 through a radio channel. According to circumstances, the UE 120 may be operated without involvement of the user. That is, at least one of the UEs 120 may be a device that performs machine-type communication (MTC), and may not be carried by the user. The UE may be referred to as 'user equipment (UE)', 'mobile station', 'subscriber station', 'customer premises equipment (CPE)', 'remote terminal', 'wireless terminal', 'electronic device', 'terminal for vehicle', 'user device", or other terms having the equivalent technical meaning, as well as a terminal.

A carrier aggregation (CA) technology is a technology introduced to 3GPP standard release 10. CA is a technology in which the UE is connected to the same type of wireless communication cell group having a common wireless resource control entity to simultaneously use frequency resources on component carriers of respective cells located in different frequency bands for signal transmission and reception, thereby increasing the frequency use efficiency of the UE and the BS. A dual connectivity (DC) technology which is one of multiple connectivity has been introduced from $3^{rd}$ generation partnership project (3GPP) standard release 12. The dual connectivity is a technology in which the UE is simultaneously connected to two independent wireless communication cell groups in different types or the same type to frequency resources on component carries of a cell within each cell group located in different frequency bands for signal transmission and reception, thereby increasing the frequency use efficiency of the UE and the BS. The dual connectivity includes a master cell group in which a control plane is directly connected to a core network to manage a radio resource control state of the UE and a secondary cell group linked to the master cell group.

Research on the dual connectivity technology and the carrier aggregation technology are actively conducted due to technical advantages of increasing efficiency to use limited radio communication resources of the UE and limited radio communication resources of the BS. Particularly, a 5G mobile communication system uses a non-standalone scheme of interworking with a 4G core network as a basic operation scheme, which is used as a core technology in a commercial service supporting the 5G mobile communication system.

Communication nodes (for example, a UE, a BS, and a core network entity) according to various embodiments of the disclosure may operate in an NR system. Communication nodes (for example, a UE, a BS, and a core network entity) according to various embodiments of the disclosure may operate together in an LTE system. Hereinafter, the structure illustrated in FIGS. 2 to 3 and layer description are made on the basis of an NR communication system as an example, but are only examples but are not construed to exclude other communication systems.

Figure 2:
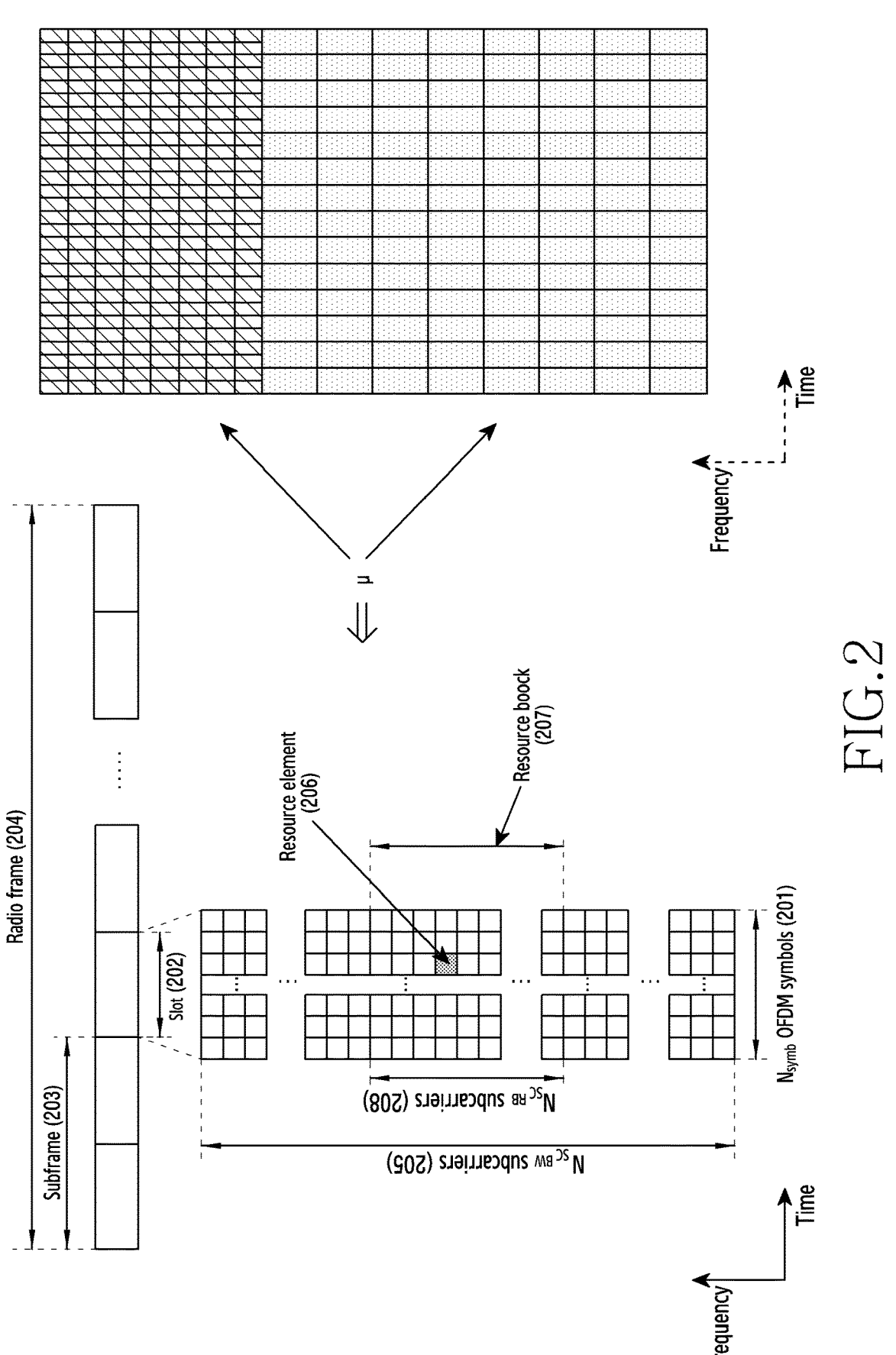
FIG. 2 illustrates an example of a radio resource region in a wireless communication system according to various embodiments of the disclosure.

FIG. 2 illustrates an example of a radio resource region in a wireless communication system according to various embodiments of the disclosure. According to various embodiments, the radio resource region may include the structure of a time-frequency domain. According to an embodiment, the wireless communication system may include an NR communication system.

Referring to FIG. 2, in the radio resource region, the horizontal axis indicates a time domain, and the vertical axis indicates a frequency domain. The length of a radio frame 204 is 10 ms. The radio frame 204 may be a time domain section including 10 subframes. The length of a subframe 203 is 1 ms. The configuration unit of the time domain may be an orthogonal frequency division multiplexing (OFDM) and/or discrete Fourier transform (DFT)-spread-OFDM (DFT-s-OFDM) symbol, and one slot 202 may include $N_{symb}$ OFDM symbols and/or DFT-s-OFDM symbols 201. In various embodiments, the OFDM symbol may include a symbol in the case in which a signal is transmitted and received using an OFDM multiplexing scheme, and the DFT-s-OFDM symbol may include a symbol in the case in which a signal is transmitted and received using a DFT-s-OFDM or single carrier frequency division multiple access (SC-FDMA) multiplexing scheme. The minimum transmission unit of the frequency domain may be a subcarrier, and the carrier bandwidth included in a resource grid may include a total of $N_{SC}^{BW}$ subcarriers 205. Further, the disclosure describes an embodiment of downlink signal transmission and reception for convenience of description, but the embodiment may be applied to an embodiment of uplink signal transmission and reception.

In some embodiments, the number of slots 202 included in one subframe 203 and the length of the slot 202 may vary depending on subcarrier spacing. The subcarrier spacing may be referred to as numerology ($\mu$) That is, subcarrier spacing, the number of slots included in a subframe, the length of a slot, and the length of a subframe may be configured to be variable. For example, when subcarrier spacing (SCS) is 15 kHz in the NR communication system, one subframe 203 may include one slot 202, and the length of each of the slot 202 and the subframe 203 may be 1 ms. Further, for example, when subcarrier spacing is 30 kHz, one subframe 203 may include two slots. At this time, the length of the slot is 0.5 ms, and the length of the subframe is 1 ms.

In some embodiments, subcarrier spacing, the number of slots included in the subframe, the length of the slot, and the length of the subframe may be variably applied according to the communication system. For example, in the LTE system, subcarrier spacing may be 15 kHz and one subframe may consist of two slots, in which case the length of the slot may be 0.5 ms and the length of the subframe may be 1 ms. In another example, in the NR system, subcarrier spacing ($\mu$) may be one of 15 kHz, 30 kHz, 60 kHz, 120 kHz, and 240 kHz, and the number of slots included in one subframe may be 1, 2, 4, 8, or 16 depending on the subcarrier spacing ($\mu$).

The basic unit of resources in the time-frequency domain is a resource element (RE) 206, and the resource element 206 may be indicated by an OFDM symbol index and a subcarrier index. A resource block may include a plurality of resource elements. In the NR system, a resource block (RB) (or a physical resource block (PRB)) may be defined by $N_{SC}^{RB}$ successive subcarriers in the frequency domain. The number $N_{SC}^{RB}$ of subcarriers may be 12. The frequency domain may include common resource blocks (CRBs). The physical resource block (PRB) may be defined in a bandwidth part (BWP) in the frequency domain. CRB and PRB numbers may be determined differently according to subcarrier spacing. In the LTE system, the RB may be defined by $N_{symb}$ consecutive OFDM symbols in the time domain and $N_{SC}^{RB}$ consecutive subcarriers in the frequency domain.

In the NR and/or LTE system, scheduling information for downlink data or uplink data may be transmitted from the BS to the terminal through downlink control information (DCI). According to various embodiments, DCI may be defined according to various formats, and each format may indicate whether DCI includes scheduling information of uplink data (for example, UL grant), whether DCI includes scheduling information of downlink data (for example, DL grant), whether DCI is compact DCI having small control information, whether DCI is fallback DCI, whether spatial multiplexing using multiple antennas is applied, and/or whether DCI is DCI for controlling power. For example, NR DCI format 1_0 or NR DCI format 1_1 may include scheduling for downlink data. Further, for example, NR DCI format 0_0 or NR DCI format 0_1 may include scheduling for downlink data. The DCI may be transmitted through a physical downlink control channel (PDCCH) (or control information, hereinafter, the PDCCH is interchangeable with the control information) or an enhanced PDCCH (EPDCCH) (or enhanced control information, hereinafter, the EPDCCH is interchangeable with the enhanced control information) via a channel coding and modulation process. Hereinafter, transmission and reception of the PDCCH or the EPDCCH may be understood as transmission and reception of the DCI on the PDCCH or the EPDCCH, and transmission and reception of a physical downlink shared channel (PDSCH) may be understood as transmission and reception of downlink data on the PDSCH.

In the NR and/or LTE system, uplink control information (UCI) may be transmitted from the UE to the BS. The uplink control information may be used to transmit at least one piece of the following control information.

Scheduling request (SR): indicates information used for making a request for uplink shared channel (UL-shared channel) resources.

HARQ-ACK: indicates a response to a PDCCH and/or a response to a downlink data packet (for example, codeword) on a PDSCH. This indicates whether the PDCCH Or the PDSCH is successfully received. For example, 1 bit of HARQ-ACK is transmitted in response to a single downlink codeword, and 2 bits of HARQ-ACK are transmitted in response to two downlink codewords. The HARQ-ACK response includes positive ACK (briefly, ACK), negative ACK (hereinafter, NACK), discontinuous transmission (DTX), or NACK/DTX. Hereinafter, in the disclosure, HARQ-ACK is interchangeably used with HARQ ACK/NACK or ACK/NACK.

Channel state information (CSI): indicates feedback information for a downlink channel. The CSI may include at least one of a rank indicator (RI), a precoding matrix indicator (PMI), a channel quality indicator (CQI), a channel state information-reference signal (CSI-RS) resource indicator (CRI), a synchronization signal/physical broadcast channel (SS/PBCH) block resource indicator (SSBRI), a layer indicator (LI), a reference signal received power (RSRP), or a signal-to-noise ratio (SINR).

Uplink control information may be transmitted through a physical channel via a channel coding and modulation process. The uplink control information may be transmitted through a physical uplink control channel corresponding to an uplink control channel or may be piggy-backed through a physical uplink shared channel (PUSCH). Hereinafter, transmission and reception of the PUCCH or the PUSCH may be understood as transmission and reception of UCI on the PUCCH or the PUSCH.

Various embodiments of the disclosure may be described on the basis of the LTE communication system or the NR communication system, but the content of the disclosure is not limited thereto and may be applied to various wireless communication systems for transmitting uplink control information. Further, the content of the disclosure can be applied to unlicensed bands as well as licensed bands as necessary.

Hereinafter, in the disclosure, higher-layer signaling or a higher signal refers to a method of transmitting a signal from the BS to the UE through a downlink data channel of a physical layer or from the UE to the BS through an uplink data channel of a physical layer. According to an embodiment, higher-layer signaling may include at least one of radio resource control (RRC) signaling, signaling according to an F1 interface between a centralized unit (CU) and a distributed unit (DU), and a signal transmission method through a media access control (MAC) control element (CE). Further, according to an embodiment, the higher-layer signaling or the higher signal may include system information, for example, a system information block (SIB) transmitted in common to a plurality of UEs.

Figure 3:
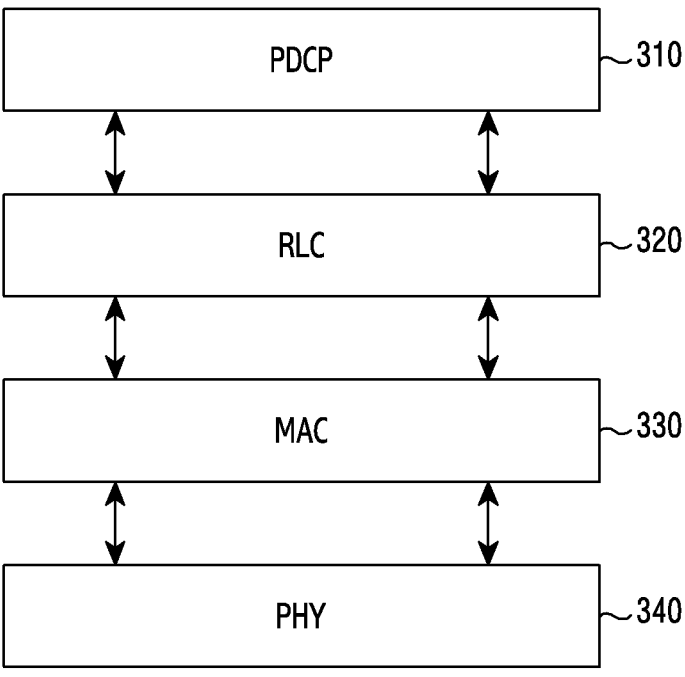
FIG. 3 illustrates an example of the structure of a radio protocol in a wireless communication system according to the disclosure.

FIG. 3 illustrates an example of the structure of a radio protocol in a wireless communication system according to the disclosure. The illustrated structure of the radio protocol may be the structure of a radio protocol in an LTE or NR communication system.

Referring to FIG. 3, the radio protocol includes a PDCP layer 310, an RRC layer 320, a MAC layer 330, and a PHY layer 340 in each of the UE and the BS. Although not illustrated in FIG. 3, in the NR system, a user plane may further include an SDAP layer for QoS management.

Main functions of the PDCP layer 310 may include some of the following functions.

Header compression and decompression function (Header compression and decompression: ROHC only)

User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

Main functions of the RLC layer 320 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The MAC layer 330 may be connected to a plurality of RLC layer devices configured in one UE and main functions of the MAC may include some of the following functions.

Mapping function (Mapping between logical channels and transport channels)

Multiplexing and demultiplexing function (Multiplexing/demultiplexing of MAC SDUs)

Scheduling information report function (Scheduling information reporting)

Transmission of the uplink control information according to various embodiments of the disclosure may be generated in the PHY layer 340. According to an embodiment, in the PHY layer 340, the UE may acquire bits of required control information without receiving a MAC PDU from the MAC layer 330. Thereafter, in the PHY layer 340, the UE may perform signal processing including channel coding and modulation/resource mapping. The UE may transmit the signal-processed control information to the BS through a radio channel.

The UE may transfer control information to the BS through an uplink control channel (for example, a PUCCH) or an uplink data channel (for example, a PUSCH). The uplink control channel, that is, an NR PUCCH is a physical channel designed to transmit uplink control information such as CSI, SR, or HARQ-ACK/NACK. The PUCCH may support various types according to a signal processing scheme. The PUCCH may be defined by a total of five formats for the size of transmitted information and coverage secure, and may be summarized as shown in [Table 1] below.

TABLE 1

| | Format 0 | Format 1 | Format 2 | Format 3 | Format 4 |
|---|---|---|---|---|---|
| Waveform | CP-OFDM | DFT-S OFDM | CP-OFDM | DFT-S OFDM | DFT-S OFDM |
| # of symbols | 1-2 | 4-14 | 1-2 | 4-14 | 4-14 |
| # of RBs | 1 | 1 | 1-16 | 1-6, 8-10, 12, 14-16 | 1 |
| # of UCI bits | $\leq 2$ | $\leq 2$ | >2 | >2 | >2 |
| UCI types | 1-bit/2-bit HARQ-ACK and/or SR | | HARQ-ACK with/without SR and/or CSI feedback | | |
| Encoding | Seq. selection | N/A | UCI bits = k 1) $3 < k \leq 11$, RM 2) $11 < k$, Polar Code | | |
| # of CRC bits | N/A | | $11 < k \leq 19$: 6 bits, $19 < k$: 11 bits | | |
| Modulation | N/A | BPSK/QPSK | QPSK | $\pi/2$ BPSK or QPSK (by configuration) | |
| DMRS ratio | N/A | ~1/2 | 1/3 | variable | |
| Freq. Hopping | Enable/Disable by UE-specific RRC signaling | | | | |
| UE multiplexing | Cyclic shift | Time domain OCC, Cyclic shift | N/A | N/A | pre-DFT-OCC (2, 4) |

HARQ function (Error correction through HARQ)

Logical channel priority control function (Priority handling between logical channels of one UE)

UE priority control function (Priority handling between UEs by means of dynamic scheduling)

MBMS service identification function (MBMS service identification)

Transport format selection function (Transport format selection)

Padding function (Padding)

The PHY layer 340 may perform an operation of channel-coding and modulating higher-layer data (data corresponding to a MAC PDU) to generate an OFDM symbol and transmitting the OFDM symbol through a radio channel or demodulating and channel-decoding the OFDM symbol received through the radio channel and transmitting the demodulated and channel-decoded OFDM symbol to the higher layer. At this time, data received from the MAC layer 330 corresponding to the higher layer may be referred to as a transport block (TB). According to an embodiment, the PHY layer 340 of the UE may decode higher-layer signaling (for example, RRC signaling) transmitted from the BS and transfer the decoding result to the MAC layer 330.

NR PUCCH formats may be divided into a long PUCCH and a short PUCCH according to the symbol length. PUCCH format 1, PUCCH format 3, or PUCCH format 4 are the long PUCCH. PUCCH format 0 or PUCCH format 2 is the short PUCCH. The PUCCH format is selected according to an operating plan of the BS, and the short PUCCH and the long PUCCH may be used together in a special case according to the existence of various scheduler scenarios required by a service operator.

At this time, in the case of the short PUCCH, the number of transmission symbols is smaller than the long PUCCH, and thus the cell coverage of the short PUCCH is smaller than the long PUCCH. Further, since the PUSCH has a minimum of two transmission symbols, the cell coverage of the short PUCCH that transmits only one symbol may be smaller than the cell coverage of the PUSCH according to a circumstance. That is, the cell coverage of the short PUCCH is small and, accordingly, a scheme for increasing the reception performance by improving a signal processing method is needed. The cell coverage may increase as much as the increased reception performance. Hereinafter, the disclosure proposes a system design, an apparatus, and a method for performing modulation based on a complex sequence in order to increase the cell coverage of the short PUCCH compared to the long PUCCH or the PUSCH during a process of processing a signal by a physical layer.

In the existing short PUCCH, the UE performs appropriate channel coding (for example, RM or polar code) according to the number of bits as shown in [Table 1], performs QPSK modulation, and then maps the same to an OFDM waveform. NR PUCCH format 2 is defined to transmit a signal by using only one to two symbols within a slot. When a PUSCH signal is transmitted in a symbol other than a PUCCH symbol within a slot, it is possible to increase resource efficiency by preventing a PUCCH from consuming analog beam resources corresponding to spatial domain resources of a PUSCH in, for example, an mmWave system corresponding to FR 2 (for example, 24250 MHz to 52600 MHz). Further, when the last symbol of a slot in which a DL PDSCH is transmitted is used as a UL short PUCCH in FR 1 (for example, 410 MHz to 7125 MHz)/FR2, a DL HARQ processing time decreases and thus the short PUCCH may be useful for a service sensitive to time delay.

In spite of the advantages, the short PUCCH (for example, PUCCH format 2) has disadvantages due to a decrease in the number of transmission symbols within a slot in comparison with other formats in an aspect of the coverage. Since the long PUCCH or the PUSCH transmits signals over several symbols, a receiver may gather power of the several symbols to improve an SNR. On the other hand, the receiver has difficulty in improving the SNR through transmission of the short PUCCH. This is because transmission power of the UE is limited and there is a limit to an increase in signal quality of the receiver through the small number of symbols. Accordingly, a technology for increasing the cell coverage of the short PUCCH is discussed as an important issue.

In order to enhance the coverage of the short PUCCH, embodiments of the disclosure propose a PUCCH transmission scheme for performing a modulation procedure using a Zadoff-Chu sequence. Particularly, a PUCCH format in which the existing quadrature phase shift keying (QPSK) is replaced with a complex sequence having a special characteristic is proposed. Further, the disclosure describes a scheme for transmitting or receiving control information using the corresponding PUCCH format. The complex sequence proposed in the disclosure may be based on the Zadoff-Chu (ZC) sequence. The ZC sequence may be a sequence of a complex number having some important mathematical properties. The mathematical properties make the ZC sequence specially useful for a mobile communication system. The mathematical properties are described below.

1) First, the ZC sequence has a constant amplitude. Such a property helps in minimization of a peak-to-average power ratio (PAPR) and may allow a power amplifier to operate with higher average power and high efficiency.

2) Auto-correlation of the ZC sequence generates very high output spike when a time shift is 0. That is, a correlation operation between the same ZC sequences may provide high output in a temporally synchronized state. On the other hand, the auto-correlation between two ZC sequences having a shift which is not 0, that is, two ZC sequences which are not temporally synchronized provides relatively very low output. Such a property allows the BS receiver to easily find synchronization of the transmitted sequence. The sequence having the property of the constant amplitude and the auto-correlation may be referred to as constant amplitude Zero auto-correlation (CAZAC) sequence. The DFT transform result of the ZC sequence may be the ZC sequence.

3) Cross-correlation of the ZC sequence provides extremely low output. In all time domains, the correlation between a specific ZC sequence and another ZC sequence may be close to $1/\sqrt{N}$ (N being the ZC sequence length). The property may allow the receiver to avoid confusion with another ZC sequence. The receiver may acquire peak output only for the sequence that matches the existing AC sequence of the correlator.

Hereinafter, a scheme for designing PUCCH transmission using the ZC sequence designed on the basis of the mathematical properties is described with reference to FIGS. 4 to 5. It is possible to increase the cell coverage by improving the reception performance of the receiver through the ZC sequence. Operations of processing the signal of PUCCH transmission proposed in the disclosure may be defined for a new PUCCH format. Meanwhile, the PUCCH format of the disclosure may be referred to as PUCCH format x in each embodiment to mean a new PUCCH format compared to PUCCH formats 0, 1, 2, 3, and 4 of the NR standard. However, PUCCH format x is only an example of the format for ZC sequence-based PUCCH transmission of the disclosure and is not construed to limit the embodiment of the disclosure. Here, x is a random integer larger than or equal to 5 such as 5, 6, 7, . . . , k or may have the form related to the existing formats such as 0a, 2a, 0_1, or 2_1.

Figure 4:
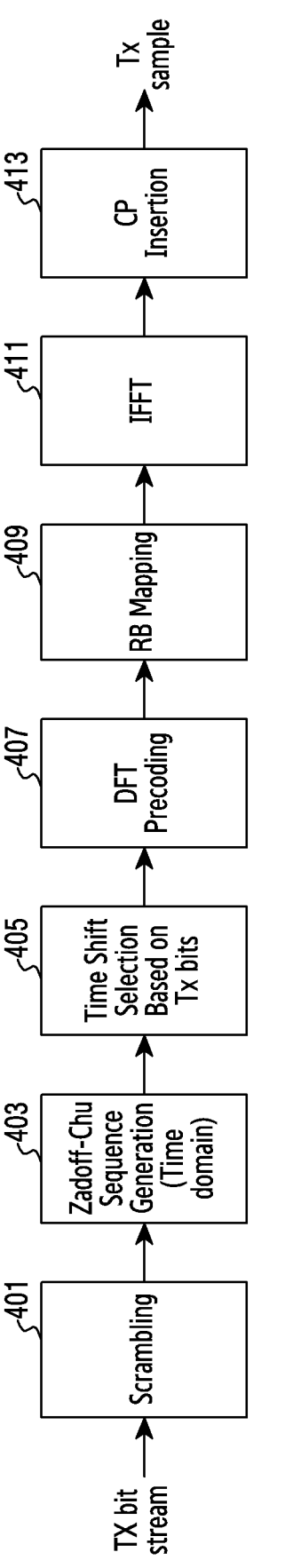
FIG. 4 illustrates an example of Zadoff-Chu (ZC) sequence-based control channel transmission according to an embodiment of the disclosure.

FIG. 4 illustrates an example of Zadoff-Chu sequence-based control channel transmission according to an embodiment of the disclosure. An example in which a transmission end transmits control information to a reception end is described. Control channel may include a PUCCH. Control information may include UCI. The transmission end indicates the UE 120 of FIG. 1. The reception end indicates the BS 110 of FIG. 1. In FIG. 4, physical layer procedures performed for bitstreams having passed through channel coding are described. For example, in FIG. 4, physical layer procedures defined in 3GPP TS 38.211 are described.

Referring to FIG. 4, in operation 401, the transmission end may perform scrambling. Although not illustrated in FIG. 4, the reception end may perform descrambling. Scrambling may be performed on the basis of a UE identifier (for example, a C-radio network temporary identifier (C-RNTI)) and a scrambling ID. The scrambling ID may be a cell ID (for example, a physical cell identifier (PCI)) or indicated by higher-layer signaling. For example, scrambling may be performed on the basis of the following equation.

$$\tilde{b}(i)=(b(i)+c(i))\bmod 2 \qquad \text{[Equation 1]}$$

b(i) denotes a bit block ands $\tilde{b}(i)$ denotes a transmission bitstream completing scrambling. The bit block is a bitstream after channel coding and rate matching are performed. A range of i is within a total number 1 of bits to be transmitted ($0 \le i \le I-1$). c(i) denotes a scrambling sequence. For example, a scrambling sequence generator may be initialized according to the following equation.

$$c_{init}=n_{RNTI}\cdot 2^{15}+n_{ID} \qquad \text{[Equation 2]}$$

$n_{RNTI}$ is a C-RNTI, and $n_{ID}$ is a scrambling ID.

After scrambling, the UE performs QPSK modulation in the case of the existing short PUCCH format (for example, NR PUCCH format 2). However, the disclosure proposes a scheme for increasing the cell coverage while using one to two symbols to maintain the advantage of the short PUCCH. Modulation is performed on the basis of orthogonal codes (or orthogonal sequence) in which the Euclidean distance between codewords is constantly maintained and a Zadoff-Chu sequence in which code properties are maintained in the time domain and the frequency domain. Further, a DFT-s-OFDM waveform (or transform precoder) having a good PAPR characteristic is used. Hereinafter, the ZC sequence-based modulation of the disclosure is performed through operation 403 to operation 407.

In operation 403, the transmission end may generate a ZC sequence. According to an embodiment, the ZC sequence may be generated in the time domain. The ZC sequence may be referred to as $z_{t,0}(n)$. A range of n is $0 \leq n \leq N_{Tone}-1$. The ZC sequence may be generated through various methods, but may be generated, for example, on the basis of the LTE/NR standard. For example, the ZC sequence may be generated on the basis of [Equation 3] below.

$$z_{t,0}(n) = e^{-j\frac{\pi t n(n+1)}{N_{Tone}}}$$ [Equation 3]

$z_{t,0}(n)$ may be a $0^{th}$ ZC sequence generated in the time domain, and $N_{Tone}$ may be the number of subcarriers of RBs allocated for transmission. In some embodiments, unlike [Equation 3], instead of $N_{Tone}$, another integer, that is, the largest prime number within a range smaller than $N_{Tone}$ may be used.

In operation 405, the transmission end may select a time shift. The time shift in the time domain may be a phase shift in the frequency domain. The transmission end may map orthogonal codewords to bitstreams previously completing scrambling in the frequency domain. Since the orthogonal codewords are generated in a complex domain, a mapping process may include a modulation process (or a modulation and encoding process). The orthogonal complex codewords in the frequency domain may be expressed as shown in the following equation.

$$d(n) = e^{j2\pi k \frac{n}{N_{Tone}}}$$ [Equation 4]

Here, k denotes an index of an orthogonal codeword. A maximum number of orthogonal codewords is $N_{Tone}$. At this time, when a signal is transmitted using one of the orthogonal codewords, the number of orthogonal codewords is determined by the number I of bits of the transmission bitstream. Accordingly, the number of candidates which can be expressed by I should be equal to or smaller than the number of RBs that is $N_{Tone}$. Therefore, the number I of bits of the transmission bitstream is limited to $I \leq \lfloor \log_2(N_{Tone}) \rfloor$.

According to an embodiment, the transmission end may be required to transmit bits larger than $\lfloor \log_2(N_{Tone}) \rfloor$ after the number $N_{Tone}$ of tones to be used is determined. At this time, the transmission end may use quasi-orthogonal codewords. $z_{t,l}(i)$ may be additionally applied to $z_{t,0}(i)$ of [equation 3] described above. When $z_{t,1}(i)$ of the length L is additionally allocated, a total number of transmission bits which can be transmitted can be expanded to $I \leq \lfloor \log_2(N_{Tone} \times L) \rfloor$.

A process of identifying a phase shift value in the frequency domain may be a process of selecting the time shift in the time domain. The time shift selection may be expressed as shown in the following equation.

$$e(n) = z_{t,0}(n+k)$$ [Equation 5]

Embodiments of the disclosure propose an apparatus and a method for generating the ZC sequence corresponding to scrambled bits with reference to properties of the ZC sequence rather than generating a complex symbol by simply modulating the scrambled bits. Referring to the above-described equations (for example, [Equation 4] and [Equation 5]), the index k of the orthogonal codeword is generated to generate the ZC sequence corresponding to the scrambled bits. At this time, the mapping relation between the scrambled bit(s) and the orthogonal codeword index (k) may be designed through various methods. Hereinafter, a gray code is described as an example for mapping between a bit block and the orthogonal codeword, but is only an example and other mapping methods can be used.

The gray code is a binary code, and only bit in the bitstream corresponding to consecutive indexes has a different characteristic. When the next bit operation is performed, a first bit is used without any change, and a second bit and the following bits may be acquired through an XOR operation with the previous bit. For example, when it is assumed that a decimal value of transmission bits (hereinafter, referred to as a bit block) in units of bits is B, the mapping relation between B and the index k may be calculated by the following pseudo code (for example, block '1011' is expressed as a decimal value of 11).

$$k=(B>>(I-1))<<(I-1)$$

For $(i=1; i<I; i++)$ $$k=OR(k,((XOR(AND(B>>(I-i),1),AND(B>>(I-1-i), 1)))<<(I-1-i))$$ [Equation 6]

A '<<(x)' operation means movement of the bitstream by x to the left, and a '>>(y)' operation means movement of the bitstream by x to the right.

For example, when a bit block having the size of 4 bits is input, the operation result according to the gray code is as shown in the following table.

TABLE 2

| Decimal number (input) | Binary number (input) | Gray code (output) |
|---|---|---|
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

In operation 407, the transmission end may perform DFT precoding. The DFT precoding may be referred to as transform precoding. The DFT precoding may be performed for the sequence acquired through operation 405. For example, the result according to the DFT precoding may be expressed as shown in the following equation.

$$f(m) = \sum_{n=0}^{N_{Tone}-1} e(n)e^{-j2\pi m \frac{n}{N_{Tone}}}$$ [Equation 7]

FIG. 4 illustrates each of the processes of generating the ZC sequence, selecting the time shift, and performing DFT precoding, but at least some procedures may be performed in different orders or a plurality of procedures may be performed once as a single procedure. According to an embodiment, the transmission end may perform ZC sequence modulation as a single procedure derived from one equation such as [Equation 7]. Although not illustrated in FIG. 4, the reception end may perform demodulation on the basis of the ZC sequence by inversely performing the above-described procedures. That is, the reception end may acquire the ZC sequence transmitted through the correlation operation and acquire the bitstream corresponding to the ZC sequence.

In operation 409, the transmission end may perform RB mapping. The transmission end may map complex-valued symbols to resource elements (REs), respectively. The RB may depend on the length of the ZC sequence. The length of the ZC sequence may depend on the number of resource elements (REs) of RBs allocated for PUCCH transmission. The transmission end may map symbols to REs of the RBs allocated for transmission. PUCCH transmission may be performed together with transmission of a demodulation reference signal (DM-RS). In PUCCH transmission, the transmission end may not map the symbols to REs related to the DM-RS.

In operation 411, the transmission end may perform IFFT. The transmission end may perform IFFT for one or two symbols. The transmission end may output a baseband signal in the time domain through IFFT. Although not illustrated in FIG. 4, the reception end may perform FFT.

In operation 413, the transmission end may perform CP insertion. The CP may provide a guard period that helps in preventing inter-symbol interference (ISI) or inter-carrier interference (ICI) due to delay spread of a propagation channel. Although not illustrated in FIG. 4, the reception end may perform CP deletion. Thereafter, the transmission end may output a transmission signal sample into which the CP is inserted. Although not illustrated in FIG. 4, the transmission end may transmit an analog signal through a radio channel via RF signal processing.

FIG. 4 illustrates signal processing procedures after channel coding of the transmission end, but embodiments of the disclosure can be applied to the reception end in the same way. That is, the reception signal processing procedure may be performed in opposition to the transmission signal processing procedure of the transmission end. According to an embodiment, the reception end may perform the processing procedure for the received signal in the order of CP deletion, FFT, and resource demapping. Thereafter, the reception end may identify the ZC sequence transmitted through the correlator (or correlation operation). The reception end may acquire a corresponding bit block from the identified ZC sequence and descramble and decode the acquired bit block, so as to acquire information bit(s) of UCI.

Figure 5:
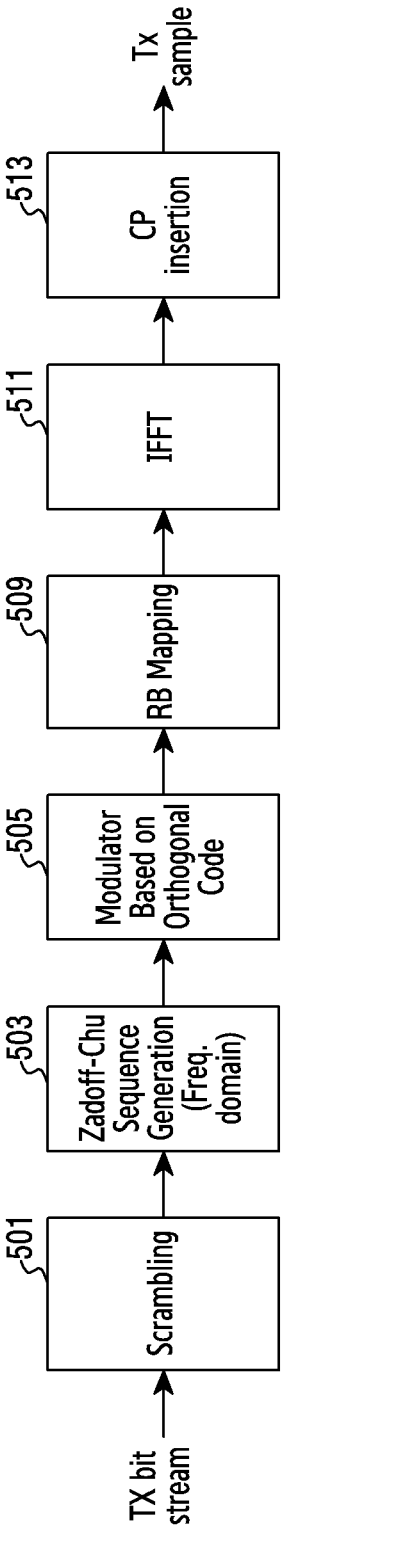
FIG. 5 illustrates an example of ZC sequence-based control channel transmission according to an embodiment of the disclosure.

FIG. 5 illustrates an example of ZC sequence-based control channel transmission according to an embodiment of the disclosure. An example in which a transmission end transmits control information to a reception end is described. Control channel may include a PUCCH. Control information may include UCI. The transmission end indicates the UE 120 of FIG. 1. The reception end indicates the BS 110 of FIG. 1. In FIG. 5, physical layer procedures performed for bitstreams having passed through channel coding are described. For example, in FIG. 4, physical layer procedures defined in 3GPP TS 38.211 are described. Particularly, in FIG. 5, a scheme for reducing complexity in the transmission end by designing a signal transmitter in the frequency domain is described.

Referring to FIG. 5, in operation 501, the transmission end may perform scrambling. Scrambling may be performed on the basis of a UE identifier (for example, a C-radio network temporary identifier (C-RNTI)) and a scrambling ID. The scrambling ID may be a cell ID (for example, a physical cell identifier (PCI)) or indicated by higher-layer signaling. For example, scrambling may be performed on the basis of the following equation. Hereinafter, since procedures in operation 401 of FIG. 4 can be applied to operation 501 equally or similarly, a detailed description is omitted.

In operation 503, the transmission end may generate a ZC sequence. In order to reduce implementation complexity of the transmission end, DFT precoding may be removed and the signal transmitter may be designed from the frequency domain using properties of the ZC sequence. Accordingly, unlike FIG. 4, the ZC sequence may be generated in the frequency domain according to an embodiment. The ZC sequence may be referred to as $z_{f,0}(n)$. A range of n is $0 \leq n \leq N_{Tone}-1$. The ZC sequence may be generated through various methods, but may be generated, for example, on the basis of the LTE/NR standard. For example, the ZC sequence may be generated on the basis of [Equation 8] below.

$$z_{f,0}(n) = e^{-j\frac{\pi f n(n+1)}{N_{Tone}}} \qquad \text{[Equation 8]}$$

$z_{f,0}(n)$ may be a $0^{th}$ ZC sequence generated in the frequency domain, and N may be the number of subcarriers of RBs allocated for transmission.

In operation 505, the transmission end may perform ZC sequence-based modulation. The ZC sequence-based modulation is performing complex symbolization on a bit block by using the generation of the ZC sequence instead of QPSK modulation performed in existing PUCCH format 2. The transmission end may acquire a transmission signal in the frequency domain through multiplication of the ZC sequence generated in the frequency domain and an orthogonal complex code of an index k (for example, the gray code according to [Equation 6]) mapped to the bit block.

$$f(n) = z_{f,0}(n)e^{j2\pi k\frac{n}{N_{Tone}}} \qquad \text{[Equation 9]}$$

f(n) may be a transmission signal in the frequency domain, $z_{f,0}(n)$ may be the ZC sequence, and $N_{Tone}$ may be the number of subcarriers of RBs allocated for transmission.

The ZC sequence has a characteristic of maintaining ZC sequence properties even before and after Fourier transform (for example, DFT). In other words, the characteristic having the constant amplitude in both the time domain and the frequency domain and the peak in the auto-correlation is maintained before and after Fourier transform. [Equation 7] of FIG. 4 may be expressed as shown in the following equation.

$$f(m) = \sum_{n=0}^{N_{Tone}-1} z_{t,0}(n+k)e^{-j2\pi m\frac{n}{N_{Tone}}} \qquad \text{[Equation 10]}$$

[Equation 10] may be a variation of [Equation 9]. In [Equation 10], when a is substituted for n+k, the following equation may be obtained.

[Equation 11]

$$f(m) = \sum_{a=k}^{N_{Tone}+k-1} z_{t,0}(a)e^{-j2\pi m\frac{(a-k)}{N_{Tone}}} = \sum_{a=k}^{N_{Tone}+k-1} z_{t,0}(a)e^{-j2\pi m\frac{a}{N_{Tone}}}e^{j2\pi m\frac{k}{N_{Tone}}}$$

The ZC sequence may have a property circulated in units of $N_{tone}$. Further, the ZC sequence in the time domain has a property of maintaining the ZC sequence even in the frequency domain in which DFT has been performed. Accordingly, $$\sum_{a=k}^{N_{Tone}+k-1} z_{t,0}(a)e^{-j2\pi m\frac{a}{N_{Tone}}}$$

may be expressed as $z_{f,0}(m)$ corresponding to the ZC sequence in the frequency domain. That is, [Equation 11] may be expressed as shown in the following equation.

$$f(m) = z_{f,0}(m)e^{j2\pi k\frac{m}{N_{Tone}}} \qquad \text{[Equation 12]}$$

[Equation 9] and [Equation 12] are the same equations except for difference in parameters. That is, an apparatus for ZC sequence-based PUCCH transmission according to embodiments of the disclosure may generate not only the ZC sequence in the time domain but also the ZC sequence in the frequency domain.

In operation 509, the transmission end may perform RB mapping. Hereinafter, since procedures in operation 409 of FIG. 4 can be applied to operation 509 equally or similarly, a detailed description is omitted.

In operation 511, the transmission end may perform IFFT. Hereinafter, since procedures in operation 411 of FIG. 4 can be applied to operation 511 equally or similarly, a detailed description is omitted.

In operation 513, the transmission end may perform CP insertion. Hereinafter, since procedures in operation 413 of FIG. 4 can be applied to operation 513 equally or similarly, a detailed description is omitted.

Although not illustrated in FIGS. 4 to 5, an orthogonal cover code (OCC) may be additionally applied in some embodiments to further improve orthogonality with another user in PUCCH transmission. The OCC having the length of 2 or 4 may be applied to output complex symbols (for example, f(m) of [Equation 9] or [Equation 12]) according to the generation of the ZC sequence.

Figure 6:
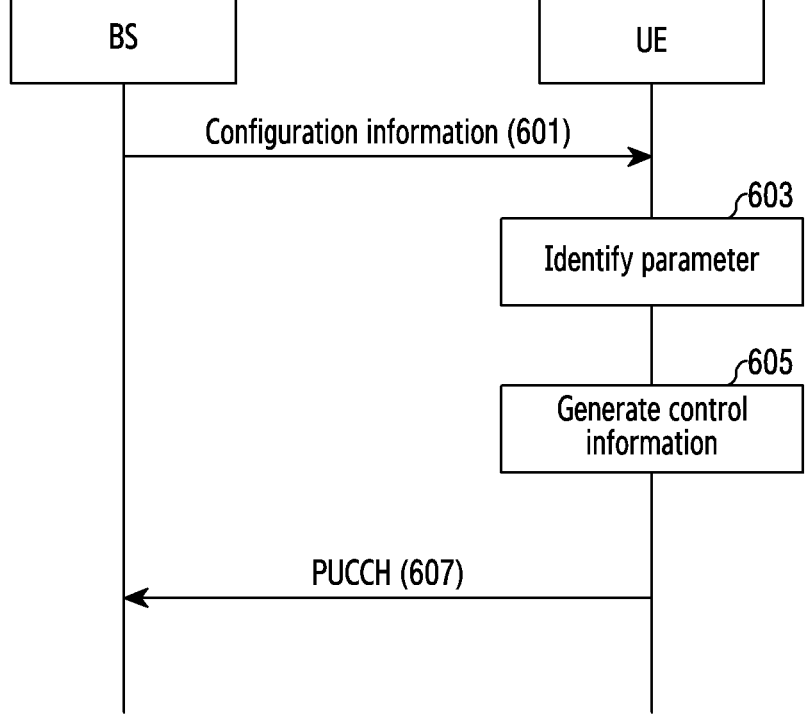
FIG. 6 illustrates an example of signaling of configuration information for ZC sequence-based control channel transmission according to an embodiment of the disclosure.

FIG. 6 illustrates an example of signaling of configuration information for ZC sequence-based control channel transmission according to an embodiment of the disclosure. The BS may transmit configuration information to the UE, and the UE may transmit uplink control information to the BS. The BS corresponds to the BS 110 of FIG. 1. The UE corresponds to the UE 120 in FIG. 1.

Referring to FIG. 6, in operation 601, the BS may transmit configuration information to the UE. The UE may receive the configuration information from the BS. The configuration information may be transmitted from the BS to the UE through higher-layer signaling. According to an embodiment, higher-layer signaling may include RRC signaling.

The configuration information may be information for configuring PUCCH parameters. According to an embodiment, the configuration information may include a PUCCH-Config IE configured per bandwidth part (BWP).

The configuration information may include a PUCCH resource. The PUCCH resource may include a configuration for PUCCH transmission resources. The PUCCH resource may include at least one piece of the following information.

1) pucch-ResourceId: indicates an identifier (value of one of 0 to 127) of the PUCCH resource.

2) starting PRB: indicates a first PRB (value of one of 0 to 127) at which PUCCH transmission starts.

3) intraslotFrequencyHopping: indicates whether frequency hopping is performed (configured as enabled or, there is no frequency hopping, configured as released). When frequency hopping is not configured, the corresponding IE may not be included (that is, optional).

4) secondHopPRB: indicates a first PRB (value of one of 0 to 127) after frequency hopping in PUCCH frequency hopping. When frequency hopping is not configured, the corresponding IE may not be included (that is, optional).

5) format: indicates selected PUCCH format information (including format information of one of 0 to k (k being integer larger than or equal to x)). According to an embodiment, the format IE may include information on a PUCCH format x according to embodiments of the disclosure. The PUCCH format x may be a PUCCH format defined to perform modulation using the complex sequence (ZC) having the length of N as described with reference to FIGS. 4 to 5.

The PUCCH format information according to embodiments of the disclosure may include at least one piece of the following information.

1) nrofPRBs: indicates information on the number of PRBs. For example, the corresponding IE may indicate one of 1 to 16.

2) nrofsymbols: indicates information on the number of symbols. For example, the corresponding IE may indicate one of 1 to 2. The PUCCH may include one or two symbols.

3) startingsymbolindex: indicates a start symbol index. For example, the corresponding IE may indicate one of 0 to 13. The slot may include 14 symbols.

4) length: indicates the length of the ZC sequence. For example, it may mean $N_{tone}$ in [Equation 3], [Equation 4], [Equation 5], [Equation 7], [Equation 8], and [Equation 9]. It may be the length of the ZC sequence required for the PUCCH format x.

5) order: indicates the number of bit blocks. It means the number of bits corresponding to a modulation unit for the PUCCH format x. For example, when the ZC sequence is generated in units of 4 bits, the order may indicate 4. Meanwhile, according to an embodiment, when the length of the ZC sequence is determined, the number of bit blocks may be determined in advance as a maximum value available within the length of the ZC sequence. In this case, the corresponding parameter may be omitted.

6) timeshift: indicates time shift information. When each orthogonal complex codeword is indicated by the time shift in the time domain, the timeshift may include a time offset for each index. For example, when the length of the ZC sequence for the PUCCH format x is 12, values of 0, 3, 6, and 9 may indicate 4 orthogonal complex codewords through the time shift. In this case, the value of timeshift may be 3.

7) addZCsequnce: indicates additional allocation information of the ZC sequence. As illustrated in FIG. 4, parameters indicating whether the quasi-orthogonal complex codeword is allocated, in other words, whether the additional ZC sequence is allocated or required for allocating the additional ZC sequence may be included.

In operation 603, the UE may identify parameters. The UE may identify parameters related to PUCCH transmission. According to an embodiment, the UE may identify PUCCH formats. According to an embodiment, the UE may identify a PRB location for PUCCH transmission. According to an embodiment, the UE may identify a start symbol of PUCCH transmission. According to an embodiment, the UE may identify whether frequency hopping of the PUCCH format is performed. According to an embodiment, the UE may identify a second start symbol in frequency hopping of the PUCCH format. According to an embodiment, the UE may identify the length of the ZC sequence for generating the orthogonal complex codeword. According to an embodiment, the UE may identify at least one parameter for generating the ZC sequence in the time domain. The UE may identify a time offset in the time domain. According to an embodiment, the UE may identify at least one parameter for generating the ZC sequence in the frequency domain. The UE may identify a phase offset in the frequency domain. According to an embodiment, the UE may identify whether to additionally allocate the ZC sequence for generating the quasi-orthogonal complex codeword.

In operation 605, the UE may generate control information. The UE may generate uplink control information. According to an embodiment, the uplink control information may indicate an SR. According to an embodiment, the uplink control information may include HARQ-ACK feedback. According to an embodiment, the uplink control information may include the SR and the HARQ-ACK feedback. According to an embodiment, the uplink control information may include the HARQ-ACK feedback and CSI. According to an embodiment, the uplink control information may include the SR, the HARQ-ACK feedback, and the CSI.

The UE may acquire one or more information bits for the uplink control information (UCI). The UE may acquire one or more information bits according to a UCI type. The UE may perform channel coding for the acquired information bits. For example, the channel coding may be repeated coding. For example, the channel coding may use a simplex code. For example, the channel coding may use a reed muller code. For example, the channel coding may use polar coding. The UE may perform scrambling after the channel coding. The UE may perform modulation on the basis of the ZC sequence corresponding to the complex sequence according to embodiments of the disclosure. The UE may identify the ZC sequence corresponding to a bitstream to be transmitted. The UE may generate a complex signal corresponding to the identified ZC sequence. The UE may sequentially perform DFT precoding, resource mapping, IFFT, and CP insertion for the generated complex signal.

In operation 607, the UE may transmit control information to the BS through the PUCCH. The BS may receive the control information from the UE through the PUCCH. Since the configuration of the defined PUCCH format x is already known, the signal received from the UE may be demodulated. According to an embodiment, the BS may demodulate the signal on the basis of the ZC sequence. The BS may acquire the bit block transmitted by the UE. The BS may acquire the bit block transmitted by the UE from the bitstream of the received signal. The BS may demodulate the bitstream of the received signal on the basis of the length of the ZC sequence configured in the UE and the codeword defined for each bit block. Thereafter, the BS may decode the signal received from the UE. The BS may acquire UCI through decoding.

Although not illustrated in FIG. 6, the UE may transmit UE capability information to the BS in some embodiments. The UE capability information may include information indicating that the new PUCCH format x proposed in the disclosure is supported. According to an embodiment, the UE may transmit a message including the UE capability information to the BS through RRC signaling. The UE capability information message may include an information element (IE) indicating that the new PUCCH format x is supported (that is, 'supported').

Figure 7A:
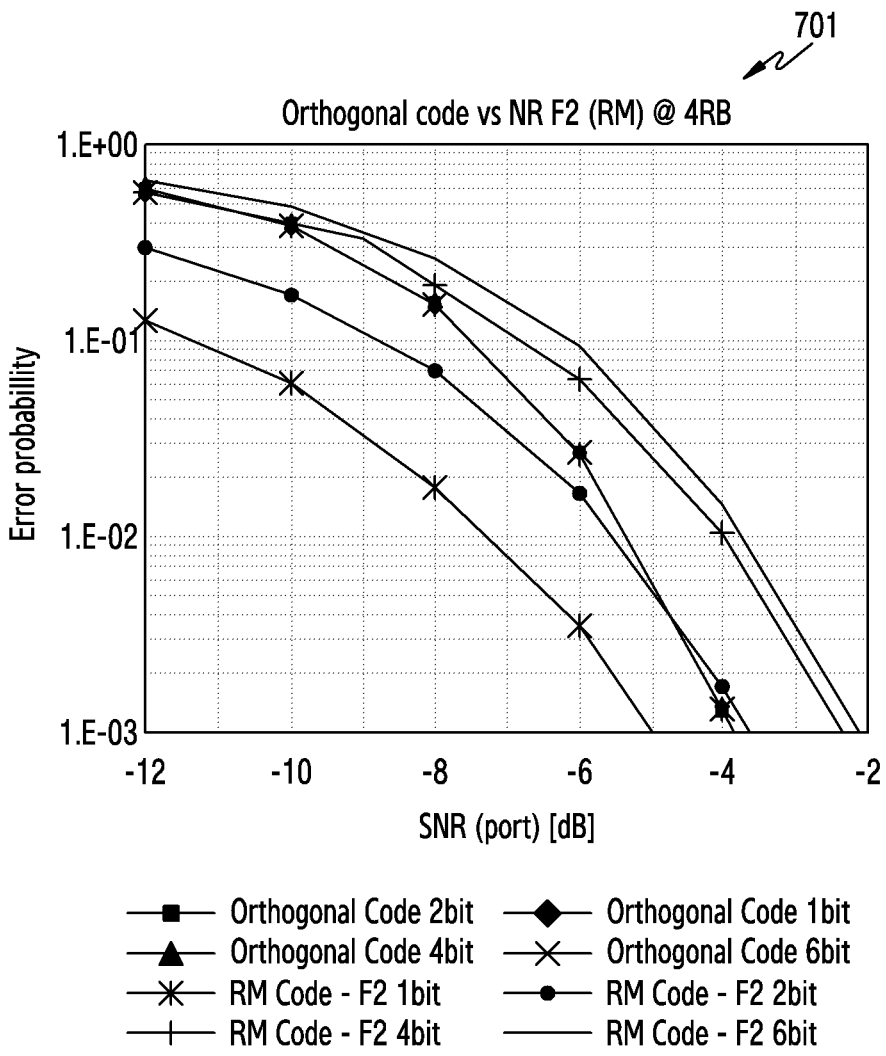
FIGS. 7A and 7B illustrate examples of the performance of ZC sequence-based control channel transmission according to an embodiment of the disclosure.
Figure 7B:
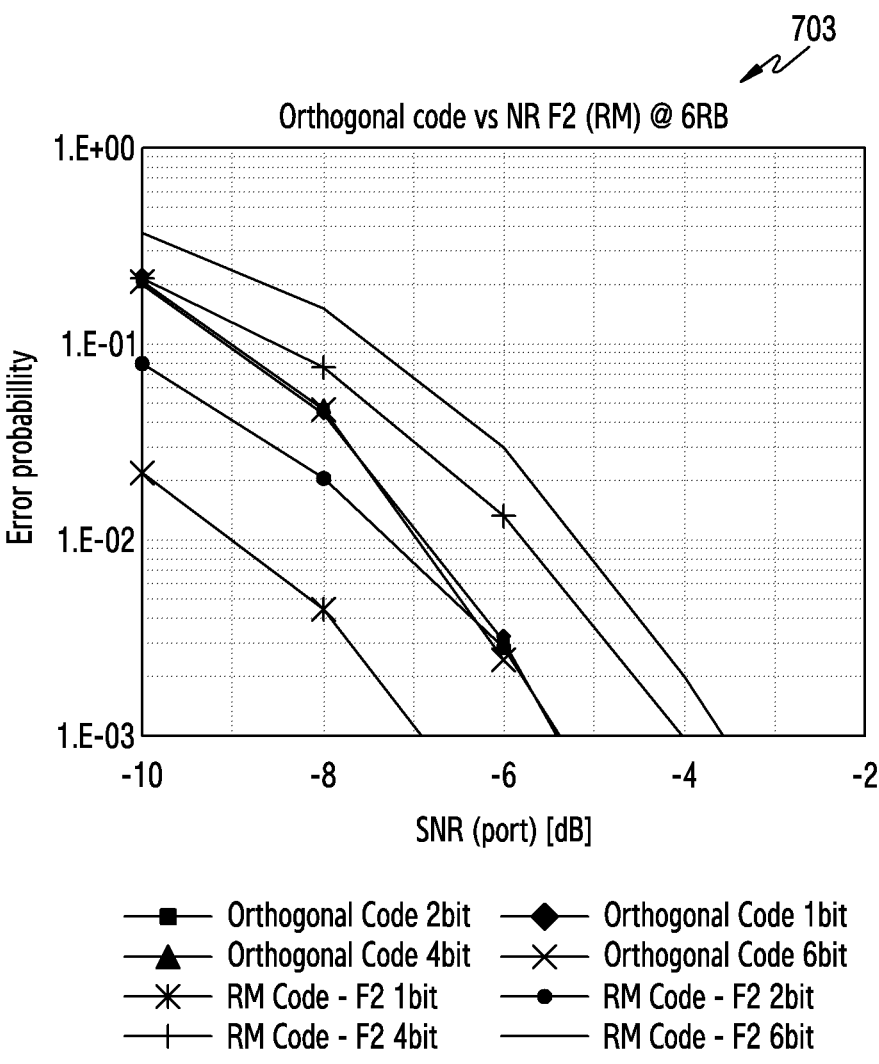

FIGS. 7A and 7B illustrate examples of the performance of ZC sequence-based control channel transmission according to an embodiment of the disclosure. FIG. 7A illustrates the reception performance in the case in which 4 PRBs are allocated for PUCCH transmission, and FIG. 7B illustrates the reception performance in the case in which 6 PRBs are allocated for PUCCH transmission. The horizontal axis indicates an SNR of the reception end, and the vertical axis indicates an error probability. The good performance means that transmission power that guarantees the same performance can be reduced. That is, the high reception performance at a specific code rate or higher may mean that embodiments of the disclosure (that is, the PUCCH format x) provides the PUCCH transmission performance higher than existing short PUCCH format 2. Hereinafter, in FIGS. 7A to 7B, orthogonal complex sequence-based PUCCH transmission is referred to as an 'orthogonal code' (or PUCCH format x, x being an integer other than 0 to 4 or a combination of an integer and a character). NR PUCCH format 2 transmission is referred to as 'F2'.

Referring to FIG. 7A, a graph 701 shows the performance for each PUCCH format according to one or more information bits when 4 RBs are allocated for PUCCH transmission. The performance for each scheme may be summarized as shown in the following table.

TABLE 3

| | 4 RBs | | | | | | | |
|---|---|---|---|---|---|---|---|---|
| | Orthogonal Code (PUCCH format x) | | | | RM Code - F2 (PUCCH format 2) | | | |
| | 1 bit | 2 bit | 4 bit | 5 bit | 1 bit | 2 bit | 4 bit | 5 bit |
| −12 | 61.11% | 60.61% | 60.27% | 60.64% | 12.84% | 29.89% | 56.59% | 66.47% |
| −10 | 38.40% | 38.23% | 38.38% | 37.78% | 6.11% | 17.07% | 39.39% | 48.90% |
| −8 | 15.64% | 15.64% | 15.43% | 15.48% | 1.80% | 7.05% | 19.66% | 27.14% |
| −6 | 2.80% | 2.76% | 2.74% | 2.71% | 0.35% | 1.68% | 6.40% | 9.39% |
| −4 | 0.14% | 0.13% | 0.14% | 0.13% | 0.03% | 0.17% | 1.03% | 1.48% |
| −2 | 0.00% | 4.00E−05 | 0.00% | 0.00% | 0.00% | 0.01% | 0.06% | 0.09% |

Orthogonal complex sequence-based PUCCH transmission of the disclosure provides a low error probability when the number of information bits is larger than that of PUCCH format 2 transmission by a predetermined value (for example, PUCCH format x has a lower error probability than PUCCH format 2 in 5 bits). In other words, when a predetermined number or more of information bits are transmitted, the cell coverage increases compared to PUCCH format 2 when the PUCCH format x of the disclosure is used.

Referring to FIG. 7B, a graph 703 shows the performance for PUCCH format according to one or more information bits when 6 RBs are allocated for PUCCH transmission. The performance for each scheme may be summarized as shown in the following table.

TABLE 4

| | 6 RBs | | | | | | | |
|---|---|---|---|---|---|---|---|---|
| | Orthogonal Code (PUCCH format x) | | | | RM Code - F2 (PUCCH format 2) | | | |
| | 1 bit | 2 bit | 4 bit | 6 bit | 1 bit | 2 bit | 4 bit | 6 bit |
| −10 | 21.45% | 21.34% | 21.16% | 21.22% | 2.22% | 8.06% | 22.35% | 37.49% |
| −8 | 4.54% | 4.63% | 4.62% | 4.79% | 0.45% | 2.10% | 7.80% | 15.75% |
| −6 | 0.30% | 0.30% | 0.29% | 0.25% | 0.03% | 0.28% | 1.35% | 3.06% |
| −4 | 0.01% | | 0.01% | | | 0.01% | 0.10% | 0.20% |
| −2 | | | | | | | | 0.01% |
| 0 | | | | | | | | |

Orthogonal complex sequence-based PUCCH transmission of the disclosure provides a low error probability when the number of information bits is larger than that of PUCCH format 2 transmission by a predetermined value (for example, PUCCH format x has a lower error probability than PUCCH format 2 in 4 bits or 6 bits). In other words, when a predetermined number or more of information bits are transmitted, the cell coverage increases compared to PUCCH format 2 when the PUCCH format x of the disclosure is used.

Figure 8:
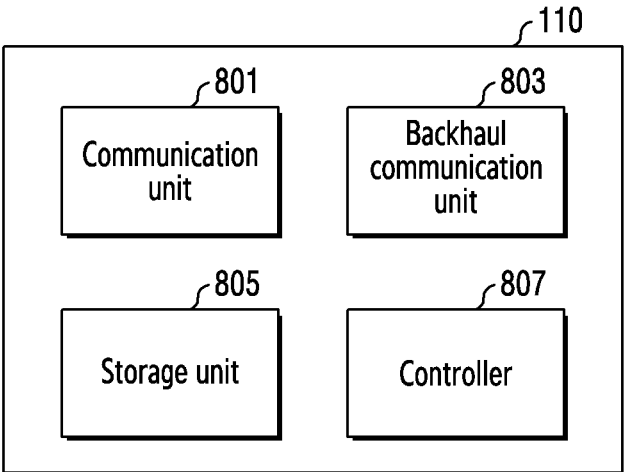
FIG. 8 illustrates a functional configuration of the BS in a wireless communication system according to various embodiments of the disclosure.

FIG. 8 illustrates a functional configuration of the BS in a wireless communication system according to various embodiments of the disclosure. The term '~unit' or '~er' used hereinafter means a unit for processing at least one function or operation, which may be implemented in hardware, software, or a combination of hardware and software.

Referring to FIG. 8, the BS includes a communication unit 801, a backhaul communication unit 803, a storage unit 805, and a controller 807.

The communication unit 801 performs functions for transmitting and receiving a signal through a radio channel. For example, the communication unit 801 performs a conversion function between a baseband signal and a bitstream according to the physical layer standard of the system. For example, in data transmission, the communication unit 801 generates complex symbols by coding and modulating the transmission bitstream. In data reception, the communication unit 801 reconstructs the reception bitstream by demodulating and decoding the baseband signal. According to various embodiments, the communication unit 801 may encode a signal by using a polar code or decode the encoded signal by using the polar code. The communication unit 801 may be configured to perform at least one of the operations of the transmission end or the operations of the reception end described with reference to FIGS. 1 to 7B. According to an embodiment, the communication unit 801 may be configured to receive an uplink control channel (for example, a PUCCH) on the basis of a complex sequence (for example, a ZC sequence).

The communication unit 801 up-converts a baseband signal into a radio-frequency (RF) band signal, transmits the same through an antenna, and down-converts an RF band signal received through an antenna into a baseband signal. To this end, the communication unit 801 may include a transmission filter, a reception filter, an amplifier, a mixer, an oscillator, a digital-to-analog convertor (DAC), an analog-to-digital convertor (ADC), and the like. The communication unit 801 may include a plurality of transmission and reception paths. In addition, the communication unit 801 may include at least one antenna array including a plurality of antenna elements. On the hardware side, the communication unit 801 may include a digital unit and an analog unit, and the analog unit may include a plurality of subunits according to operation power, operation frequency, and the like. According to an embodiment, the communication unit 801 may include a unit for forming beams, that is, a beamforming unit. For example, the communication unit 801 may include a massive MIMO unit (MMU) for beamforming.

The communication unit 801 may transmit and receive a signal. To this end, the communication unit 801 may include at least one transceiver. For example, the communication unit 801 may transmit a synchronization signal, a reference signal, system information, a message, control information, or data. The communication unit 801 may perform beamforming. The communication unit 801 may apply a beamforming weight to a signal in order to assign directivity according to a configuration of a signal by the controller 807 to be transmitted/received. According to an embodiment, the communication unit 801 may generate a baseband signal according to a scheduling result and a transmission power calculation result. Further, the RF unit within the communication unit 801 may transmit the generated signal through the antenna.

The communication unit 801 transmits and receives the signal as described above. Accordingly, all or some of the communication unit 801 may be referred to as a "transmitter", a "receiver", or a "transceiver". Further, in the following description, transmission and reception performed through a radio channel are used to include the performance of processing by the communication unit 801.

The backhaul communication unit 803 provides an interface for communicating with other nodes within the network. That is, the backhaul communication unit 803 converts a bit stream transmitted from the BS to another node, for example, another access node, another BS, or a core network, into a physical signal, and converts a physical signal received from another node into a bitstream.

The storage unit 805 stores a basic program for the operation of the BS, an application program, and data such as configuration information. The storage unit 805 may include a memory. The storage unit 805 may include a volatile memory, a non-volatile memory, or a combination of the volatile memory and the non-volatile memory. The storage unit 805 provides stored data according to a request from the controller 807.

The controller 807 controls the overall operation of the BS. For example, the controller 807 transmits and receives a signal through the communication unit 801 or the backhaul communication unit 803. The controller 807 records data in the storage unit 805 and read the same. The controller 807 may perform the functions of a protocol stack required for communication standards. To this end, the controller 807 may include at least one processor. According to various embodiments, the controller 807 may control the BS to perform the operations according to the above-described various embodiments.

The configuration of the BS 110 illustrated in FIG. 8 is only an example of the BS and the example of the BS implementing various embodiments of the disclosure is not limited to the configuration illustrated in FIG. 8. That is, according to various embodiments, some elements may be added, deleted, or changed.

Although FIG. 8 illustrates the BS as one entity, the disclosure is not limited thereto as described above. The BS according to various embodiments of the disclosure may be implemented to configure an access network having not only integrated deployment (for example, eNB of LTE) but also distributed deployment. As illustrated to describe embodiments of FIGS. 1 to 7B, the BS is divided into a central unit (CU) and a digital unit (DU), and the CU may be implemented to perform a higher-layer function (upper layers) (for example, packet data convergence protocol (PDCP) and RRC) and the DU may be implemented to perform a lower-layer function (lower layers) (for example, medium access control (MAC) and physical (PHY)).

As described above, the BS having the distributed deployment may further include a configuration for fronthaul interface communication. According to an embodiment, the BS may perform functions for transmitting and receiving a signal in a wired communication environment. The DU may include a wired interface for controlling a direct connection between devices through a transmission medium (for example, a copper wire or optical fiber). For example, the DU may transfer an electrical signal to another device through the copper wire or perform conversion between an electrical signal and an optical signal. The DU may be connected to the CU of the distributed deployment. However, such a description is not construed to exclude a scenario in which the DU is connected to the CU through a wireless network. Further, the DU may be additionally connected to a radio unit (RU). However, such a description is not construed to exclude a radio environment including only the CU and the DU.

Figure 9:
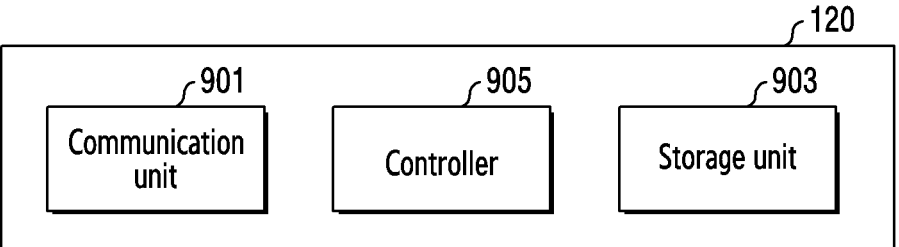
FIG. 9 illustrates a functional configuration of the UE in a wireless communication system according to various embodiments of the disclosure.

FIG. 9 illustrates a functional configuration of the UE in a wireless communication system according to various embodiments of the disclosure. The term '~unit' or '~er' used hereinafter means a unit for processing at least one function or operation, which may be implemented in hardware, software, or a combination of hardware and software.

Referring to FIG. 9, the UE includes a communication unit 901, a storage unit 903, and a controller 905.

The communication unit 901 performs functions for transmitting and receiving a signal through a radio channel. For example, the communication unit 901 performs a conversion function between a baseband signal and a bitstream according to the physical layer standard of the system. For example, in data transmission, the communication unit 901 generates complex symbols by coding and modulating the transmission bitstream. In data reception, the communication unit 901 reconstructs the reception bitstream by demodulating and decoding the baseband signal. According to various embodiments, the communication unit 901 may encode a signal by using a polar code or decode the signal encoded using the polar code. The communication unit 901 may be configured to perform at least one of the operations of the transmission end or the operations of the reception end described with reference to FIGS. 1 to 7. According to an embodiment, the communication unit 901 may be configured to transmit an uplink control channel (for example, a PUCCH) on the basis of a complex sequence (for example, a ZC sequence).

The communication unit 901 up-converts a baseband signal to an RF band signal, transmits the RF band signal through an antenna, and then down-converts the RF band signal received through the antenna to the baseband signal. For example, the communication unit 901 may include a transmission filter, a reception filter, an amplifier, a mixer, an oscillator, a DAC, an ADC, and the like.

The communication unit 901 may include a plurality of transmission and reception paths. The communication unit 901 may include an antenna unit. The communication unit 901 may include at least one antenna array having a plurality of antenna elements. On the hardware side, the communication unit 901 may include a digital circuit and an analog circuit (for example, a radio frequency integrated circuit (RFIC)). The digital circuit and the analog circuit may be implemented as one package. The communication unit 901 may include a plurality of RF chains. The communication unit 901 may perform beamforming. The communication unit 901 may apply a beamforming weight to a signal in order to assign directivity according to a configuration of a signal by the controller 905 to be transmitted/received.

The communication unit 901 may transmit and receive a signal. To this end, the communication unit 901 may include at least one transceiver. The communication unit 901 may receive a downlink signal. The downlink signal may include a synchronization signal (SS), a reference signal (RS) (for example, a cell-specific reference signal (CRS), a demodulation (DM)-RS), system information (for example, a MIB, an SIB, remaining system information (RMSI), and other system information (OSI)), a configuration message, control information, or downlink data. The communication unit 901 may transmit an uplink signal. The uplink signal may include uplink control information (UCI), a random access-related signal (for example, a random access preamble (RAP) (or message 1 (Msg1), message 3 (Msg3)), a reference signal (for example, a sounding reference signal (SRS) or a DM-RS), or a buffer status report (BSR)). For example, the uplink control information may include at least one of a scheduling request (SR), ACK/NACK information of a hybrid acknowledge (HARM) procedure, or channel state information (CSI).

Specifically, the communication unit 901 may include an RF processing unit and a baseband processing unit. The RF processing unit performs a function of transmitting and receiving a signal through a radio channel such as signal bandwidth conversion, amplification, and the like. That is, the RF processing unit up-converts a baseband signal provided from the baseband processing unit into an RF band signal, transmits the RF band signal through an antenna, and then down-converts the RF band signal received through the antenna into a baseband signal. For example, the RF processing unit may include a transmission filter, a reception filter, an amplifier, a mixer, an oscillator, a digital to analog convertor (DAC), an analog to digital convertor (ADC), and the like. Although only one antenna is illustrated in FIG. 2H, the UE may include a plurality of antennas. The RF processing unit may include a plurality of RF chains. The RF processing unit may perform beamforming. For the beamforming, the RF processing unit may control a phase and a size of each signal transmitted/received through a plurality of antennas or antenna elements.

The baseband processing unit may perform a function of conversion between a baseband signal and a bitstream according to a physical layer standard of the system. For example, in data transmission, the baseband processing unit generate complex symbols by encoding and modulating the transmission bitstream. In data reception, the baseband processing unit reconstructs the reception bitstream through the demodulation and decoding of the baseband signal provided from the RF processing unit. For example, in an orthogonal frequency division multiplexing (OFDM) scheme, when data is transmitted, the baseband processing unit generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, in data reception, the baseband processing unit divides the baseband signal provided from the RF processing unit in units of OFDM symbols, reconstructs the signals mapped to the subcarriers through an fast Fourier transform (FFT) operation, and then reconstructs a reception bitstream through demodulation and decoding.

The communication unit 901 transmits and receives the signal as described above. Accordingly, all or some of the communication unit 901 may be referred to as a transmitter, a receiver, or a transceiver. The communication unit 901 may include a plurality of communication modules for supporting a plurality of different radio access technologies. The communication unit 901 may include different communication modules for processing signals in different frequency bands. For example, the different radio access technologies may include a wireless LAN (for example, IEEE 802.1) and a cellular network (for example, LTE). Further, the different frequency bands may include a Super High Frequency (SHF) (for example, 2.5 GHz and 5 Ghz) band and a millimeter (mm) wave (for example, 60 GHz) band. The communication unit 901 may use the same type of RAT in an unlicensed band for different frequency bands (for example, licensed assisted access (LAA)) and citizens broadband radio service (CBRS) (for example, 3.5 GHz).

The storage unit 903 stores a basic program for the operation of the UE, an application program, and data such as configuration information. The storage unit 903 may include a volatile memory, a non-volatile memory, or a combination of the volatile memory and the non-volatile memory. The storage unit 903 stores data such as a basic program, an application program, and configuration information for the operation of the UE.

The controller 905 may control general operations of the UE. For example, the controller 905 transmits and receives a signal through the communication unit 901. The controller 905 records data in the storage unit 903 and read the same. The controller 905 may perform functions of a protocol stack required by the communication standard. To this end, the controller 905 may include at least one processor. The controller 905 may include at least one processor or microprocessor or may be a part of the processor. Some of the communication unit 901 may be referred to as a CP of the controller 905. The controller 905 may include various modules for performing communication. According to various embodiments, the controller 905 may control the UE to perform operations according to various embodiments described below.

The controller 905 controls the overall operation of the UE. For example, the controller 905 transmits and receives a signal through the communication unit 901. In addition, the controller 905 may record data in the storage unit 903 and read the data. To this end, the controller 905 may include at least one processor. For example, the controller 905 may include a Communications Processor (CP) that performs control for communication, and an Application Processor (AP) that controls higher layers such as an application layer. According to various embodiments of the disclosure, the controller 905 may be configured to perform a dynamic spectrum sharing function. According to an embodiment, the controller 905 may be configured to allow the UE 120 to dynamically use an LTE cell and an NR cell in an EN-DC environment. According to an embodiment, the controller 905 may be configured to allow the UE 120 to dynamically use cells by two nodes in an MR-DC environment as well as the EN-DC environment. Further, the controller 905 may control the UE to perform operations according to the above-described various embodiments.

According to various embodiments of the disclosure, a method performed by a UE in a wireless communication system may include a process of acquiring information bits for uplink control information, a process of acquiring a transmission bitstream, based on channel coding and scrambling for the information bits, a process of generating a transmission complex sequence corresponding to the transmission bitstream among a plurality of complex sequences, and a process of transmitting a signal of the transmission complex sequence to a BS through a physical uplink control channel (PUCCH), and each of the plurality of complex sequences may be based on a Zadoff-Chu (ZC) sequence, and a length of the ZC sequence may be larger than a number of candidate values of the transmission bitstream.

According to an embodiment, the uplink control information may include at least one of channel state information (CSI), a scheduling request (SR), or hybrid acknowledge repletion request (HARQ)-acknowledge/non-acknowledge (ACK/NACK).

According to an embodiment, the transmission complex sequence may be transmitted through one symbol or two symbols.

According to an embodiment, discrete Fourier transform (DFT) precoding may be applied to the transmission complex sequence, the signal of the transmission complex sequence may be based on an equation of $$f(m) = \sum_{n=0}^{N_{Tone}-1} z_{t,0}(n+k)e^{-j2\pi m \frac{n}{N_{Tone}}},$$

f(m) is an output of the DFT precoding, k may be a codeword index corresponding to the transmission bitstream, $N_{Tone}$ may be the length of the ZC sequence, and $z_{t,0}(i)$ may be a ZC sequence generated in a time domain.

According to an embodiment, the signal of the transmission complex sequence may be based on an equation of $$f(m) = z_{f,0}(m)e^{j2\pi k\frac{m}{N_{Tone}}},$$

f(m) may be an output of the DFT precoding, k may be a codeword index corresponding to the transmission bitstream, $N_{tone}$ may be the length of the ZC sequence, and $z_{t,0}(i)$ may be a ZC sequence generated in a frequency domain0

According to an embodiment, the method may further include a process of receiving configuration information from the BS through radio resource control (RRC) signaling, and the configuration information may include PUCCH format information for the transmission complex sequence.

According to an embodiment, the configuration information may further include the length of the transmission complex sequence or information related to a number of bits of the transmission bitstream corresponding to the transmission complex sequence.

According to an embodiment, the process of generating the transmission complex sequence may include a process of identifying a codeword index corresponding to the transmission bitstream among a plurality of codeword indexes and a process of generating a transmission complex sequence corresponding to the codeword index, and the plurality of complex sequences may correspond to the plurality of codeword indexes.

According to an embodiment, the codeword index may be determined according to a gray code.

According to an embodiment, the process of transmitting the signal of the transmission complex sequence may include a process of performing resource mapping for the signal of the transmission complex sequence, and resource elements (REs) related to the length of the ZC sequence may be used for the resource mapping, and a resource element (RE) for a demodulation reference signal (DM-RS) may not be used for the resource mapping.

According to various embodiments of the disclosure, a UE in a wireless communication system may include at least one transceiver, and at least one processor, and the at least one processor is configured to acquire a transmission bitstream, based on channel coding and scrambling for the information bits, generate a transmission complex sequence corresponding to the transmission bitstream among a plurality of complex sequences, and transmit a signal of the transmission complex sequence to a base station (BS) through a physical uplink control channel (PUCCH), and each of the plurality of complex sequences may be based on a Zadoff-Chu (ZC) sequence, and a length of the ZC sequence may be larger than a number of candidate values of the transmission bitstream.

According to an embodiment, the uplink control information may include at least one of channel state information (CSI), a scheduling request (SR), or hybrid acknowledge repletion request (HARQ)-acknowledge/non-acknowledge (ACK/NACK).

According to an embodiment, the transmission complex sequence may be transmitted through one symbol or two symbols.

According to an embodiment, discrete Fourier transform (DFT) precoding may be applied to the transmission complex sequence, the signal of the transmission complex sequence may be based on an equation of $$f(m) = \sum_{n=0}^{N_{Tone}-1} z_{t,0}(n+k)e^{-j2\pi m\frac{n}{N_{Tone}}},$$

f(m) is an output of the DFT precoding, k may be a codeword index corresponding to the transmission bitstream, $N_{tone}$ may be the length of the ZC sequence, and may be a ZC sequence generated in a time domain.

According to an embodiment, the signal of the transmission complex sequence may be based on an equation of $$f(m) = z_{f,0}(m)e^{j2\pi k\frac{m}{N_{Tone}}},$$

f(m) may be an output of the DFT precoding, k may be a codeword index corresponding to the transmission bitstream, $N_{tone}$ may be the length of the ZC sequence, and f(m) may be a ZC sequence generated in a frequency domain.

According to an embodiment, the at least one processor may be additionally configured to receive configuration information from the BS through radio resource control (RRC) signaling, and the configuration information may include PUCCH format information for the transmission complex sequence.

According to an embodiment, the configuration information may further include the length of the transmission complex sequence or information related to a number of bits of the transmission bitstream corresponding to the transmission complex sequence.

According to an embodiment, in order to generate the transmission complex sequence, the at least one processor may be configured to identify a codeword index corresponding to the transmission bitstream among a plurality of codeword indexes and generate a transmission complex sequence corresponding to the codeword index, and the plurality of complex sequences may correspond to the plurality of codeword indexes.

According to an embodiment, the codeword index may be determined according to a gray code.

According to an embodiment, in order to transmit the signal of the transmission complex sequence, the at least one processor may be configured to perform resource mapping for the signal of the transmission complex sequence, and resource elements (REs) related to the length of the ZC sequence may be used for the resource mapping, and a resource element (RE) for a demodulation reference signal (DM-RS) may not be used for the resource mapping.

According to various embodiments of the disclosure, a method performed by a BS in a wireless communication system may include a process of receiving a signal from a user equipment (UE) through a physical uplink control channel (PUCCH), a process of acquiring a transmission complex sequence of the signal among a plurality of complex sequences, and a process of acquiring information bits for uplink control information by descrambling and decoding a transmission bitstream corresponding to the transmission complex sequence, and each of the plurality of complex sequences may be based on a Zadoff-Chu (ZC) sequence, and a length of the ZC sequence may be larger than a number of candidate values of the transmission bitstream.

According to an embodiment, discrete Fourier transform (DFT) precoding may be applied to the transmission complex sequence, the signal of the transmission complex sequence may be based on an equation of $$f(m) = \sum_{n=0}^{N_{Tone}-1} z_{t,0}(n+k)e^{-j2\pi m\frac{n}{N_{Tone}}},$$

f(m) is an output of the DFT precoding, k may be a codeword index corresponding to the transmission bitstream, $N_{tone}$ may be the length of the ZC sequence, and may be a ZC sequence generated in a time domain.

According to an embodiment, the signal of the transmission complex sequence may be based on an equation of $$f(m) = z_{f,0}(m)e^{j2\pi k\frac{m}{N_{Tone}}},$$

f(m) may be an output of the DFT precoding, k may be a codeword index corresponding to the transmission bitstream, $N_{tone}$ may be the length of the ZC sequence, and may be a ZC sequence generated in a frequency domain.

According to an embodiment, the method may further include a process of transmitting configuration information to the UE through radio resource control (RRC) signaling, and the configuration information may include PUCCH format information for the transmission complex sequence.

According to an embodiment, the configuration information may further include the length of the transmission complex sequence or information related to a number of bits of the transmission bitstream corresponding to the transmission complex sequence.

According to various embodiments of the disclosure, a BS in a wireless communication system may include at least one transceiver and at least one processor, and the at least one processor may be configured to receive a signal from a user equipment (UE) through a physical uplink control channel (PUCCH), acquire a transmission complex sequence of the signal among a plurality of complex sequences, and acquire information bits for uplink control information by descrambling and decoding a transmission bitstream corresponding to the transmission complex sequence, and each of the plurality of complex sequences may be based on a Zadoff-Chu (ZC) sequence, and a length of the ZC sequence may be larger than a number of candidate values of the transmission bitstream.

According to an embodiment, discrete Fourier transform (DFT) precoding may be applied to the transmission complex sequence, the signal of the transmission complex sequence may be based on an equation of $$f(m) = \sum_{n=0}^{N_{Tone}-1} z_{t,0}(n+k)e^{-j2\pi m\frac{n}{N_{Tone}}},$$

f(m) is an output of the DFT precoding, k may be a codeword index corresponding to the transmission bitstream, $N_{tone}$ may be the length of the ZC sequence, and may be a ZC sequence generated in a time domain.

According to an embodiment, the signal of the transmission complex sequence may be based on an equation of $$f(m) = z_{f,0}(m)e^{j2\pi k\frac{m}{N_{Tone}}},$$

f(m) may be an output of the DFT precoding, k may be a codeword index corresponding to the transmission bitstream, $N_{tone}$ may be the length of the ZC sequence, and may be a ZC sequence generated in a frequency domain.

According to an embodiment, the at least one processor may be additionally configured to transmit configuration information to the UE through radio resource control (RRC) signaling, and the configuration information may include PUCCH format information for the transmission complex sequence.

According to an embodiment, the configuration information may further include the length of the transmission complex sequence or information related to a number of bits of the transmission bitstream corresponding to the transmission complex sequence.

Operations of the BS or the UE performed for the existing uplink transmission may be applied equally or similarly to ZC sequence-based PUCCH transmission of the disclosure. According to an embodiment, the PUCCH format x may apply frequency hopping. According to another embodiment, the PUCCH format x may not configure frequency hopping. According to an embodiment, the PUCCH format x is described in a normal uplink carrier (NUL) environment, but may be equally or similarly applied to a supplementary uplink carrier (SUL).

The disclosure describes a scheme for performing modulation using the ZC sequence in order to improve the cell coverage of the short PUCCH format such as PUCCH format 2. The disclosure proposes a new PUCCH format (for example, the PUCCH format x) and configuration signaling for the format. The operation of the UE and the BS for configuration signaling or PUCCH transmission may be understood as an embodiment of the disclosure. According to an embodiment, the UE may generate a PUCCH signal on the basis of the time domain ZC sequence. The BS may demodulate and decode the signal. According to an embodiment, the UE may generate a PUCCH signal on the basis of the frequency domain ZC sequence. The BS may demodulate and decode the signal. According to an embodiment, the UE may generate a sequence according to a quasi-orthogonal code and transmit a PUCCH through the generated sequence to diversify not only an orthogonal code sequence but also a code rate. The BS may demodulate and decode the signal. The proposed transmission and reception system aims at performing the conventional encoding or modulation through the ZC sequence and increasing the cell coverage through an orthogonal code characteristic.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure.

What is claimed is:

1. A method performed by a user equipment (UE) in a wireless communication system, the method comprising:

receiving, from a base station (BS) via a radio resource control (RRC) signalling, configuration information configuring a physical uplink control channel (PUCCH) format associated with a Zadoff-Chu (ZC) sequence;

acquiring information bits for uplink control information;

acquiring a transmission bitstream based on channel coding and scrambling for the information bits;

generating a transmission complex sequence corresponding to the transmission bitstream, among a plurality of complex sequences; and transmitting, to the BS, a signal of the transmission complex sequence on a PUCCH, wherein each of the plurality of complex sequences is based on the ZC sequence, and wherein a length of the ZC sequence is larger than a number of candidate values of the transmission bitstream.

2. The method of claim 1, wherein the uplink control information comprises at least one of channel state information (CSI), a scheduling request (SR), or a hybrid acknowledge repletion request (HARQ)-acknowledge/non-acknowledge (ACK/NACK).

3. The method of claim 1, wherein the transmission complex sequence is transmitted on one symbol or two symbols.

4. The method of claim 1, wherein a discrete Fourier transform (DFT) precoding is applied to the transmission complex sequence, and wherein the signal of the transmission complex sequence is based on an equation, $$f(m) = \sum_{n=0}^{N_{Tone}-1} z_{t,0}(n+k)e^{-j2\pi m \frac{n}{N_{Tone}}},$$

and f(m) is an output of the DFT precoding, k is a codeword index corresponding to the transmission bitstream, $N_{tone}$ is the length of the ZC sequence, and $z_{t,0}(i)$ is a ZC sequence generated in a time domain.

5. The method of claim 1, wherein the signal of the transmission complex sequence is based on an equation, $$f(m) = z_{f,0}(m)e^{j2\pi k \frac{m}{N_{Tone}}},$$

and f(m) is an output of a discrete Fourier transform (DFT) precoding, k is a codeword index corresponding to the transmission bitstream, $N_{tone}$ is the length of the ZC sequence, and $z_{t,0}(i)$ is a ZC sequence generated in a frequency domain.

6. The method of claim 1, wherein the configuration information comprises the length of the ZC sequence or information associated with a number of bits of the transmission bitstream corresponding to the transmission complex sequence.

7. The method of claim 1, wherein the generating of the transmission complex sequence comprises:

identifying a codeword index corresponding to the transmission bitstream among a plurality of codeword indexes; and generating the transmission complex sequence corresponding to the codeword index, wherein the plurality of complex sequences correspond to the plurality of codeword indexes.

8. The method of claim 7, wherein the codeword index is determined according to a gray code.

9. The method of claim 1, wherein the transmitting of the signal of the transmission complex sequence comprises performing resource mapping for the signal of the transmission complex sequence, wherein resource elements (REs) associated with the length of the ZC sequence are used for the resource mapping, and wherein a resource element (RE) for a demodulation reference signal (DM-RS) is not used for the resource mapping.

10. A user equipment (UE) in a wireless communication system, the UE comprising:

at least one transceiver; and at least one processor configured to:

receive, from a base station (BS) via a radio resource control (RRC) signalling, configuration information configuring a physical uplink control channel (PUCCH) format associated with a Zadoff-Chu (ZC) sequence;

acquire information bits for uplink control information;

acquire a transmission bitstream based on channel coding and scrambling for the information bits;

generate a transmission complex sequence corresponding to the transmission bitstream, among a plurality of complex sequences; and transmit, to the BS, a signal of the transmission complex sequence on a PUCCH, wherein each of the plurality of complex sequences is based on the ZC sequence, and wherein a length of the ZC sequence is larger than a number of candidate values of the transmission bitstream.

11. The UE of claim 10, wherein the uplink control information comprises at least one of channel state information (CSI), a scheduling request (SR), or a hybrid acknowledge repletion request (HARQ)-acknowledge/non-acknowledge (ACK/NACK).

12. The UE of claim 10, wherein the transmission complex sequence is transmitted on one symbol or two symbols.

13. The UE of claim 10, wherein a discrete Fourier transform (DFT) precoding is applied to the transmission complex sequence, and wherein the signal of the transmission complex sequence is based on an equation, $$f(m) = \sum_{n=0}^{N_{Tone}-1} z_{t,0}(n+k)e^{-j2\pi m \frac{n}{N_{Tone}}},$$

and f(m) is an output of the DFT precoding, k is a codeword index corresponding to the transmission bitstream, $N_{tone}$ is the length of the ZC sequence, and $z_{t,0}(i)$ is a ZC sequence generated in a time domain.

14. The UE of claim 10, wherein the signal of the transmission complex sequence is based on an equation, $$f(m) = z_{f,0}(m)e^{j2\pi k \frac{m}{N_{Tone}}},$$

and f(m) is an output of a discrete Fourier transform (DFT) precoding, k is a codeword index corresponding to the transmission bitstream, $N_{tone}$ is the length of the ZC sequence, and $z_{t,0}(i)$ is a ZC sequence generated in a frequency domain.

15. The UE of claim 10, wherein the configuration information comprises the length of the ZC sequence or information associated with a number of bits of the transmission bitstream corresponding to the transmission complex sequence.

16. The UE of claim 10, wherein the generating of the transmission complex sequence comprises:

identifying a codeword index corresponding to the transmission bitstream among a plurality of codeword indexes; and generating the transmission complex sequence corresponding to the codeword index, wherein the plurality of complex sequences correspond to the plurality of codeword indexes.

17. A method performed by a base station (BS) in a wireless communication system, the method comprising:

transmitting, to a user equipment (UE) via a radio resource control (RRC) signalling, configuration information configuring a physical uplink control channel (PUCCH) format associated with a Zadoff-Chu (ZC) sequence;

receiving a signal from a the UE on a PUCCH;

acquiring a transmission complex sequence of the signal among a plurality of complex sequences; and acquiring information bits for uplink control information by descrambling and decoding a transmission bitstream corresponding to the transmission complex sequence, wherein each of the plurality of complex sequences is based on the ZC sequence, and wherein a length of the ZC sequence is larger than a number of candidate values of the transmission bitstream.

18. The method of claim 17, wherein a discrete Fourier transform (DFT) precoding is applied to the transmission complex sequence, and wherein the signal of the transmission complex sequence is based on an equation, $$f(m) = \sum_{n=0}^{N_{Tone}-1} z_{t,0}(n+k)e^{-j2\pi m \frac{n}{N_{Tone}}},$$

and f(m) is an output of the DFT precoding, k is a codeword index corresponding to the transmission bitstream, $N_{tone}$ is the length of the ZC sequence, and $z_{t,0}(i)$ is a ZC sequence generated in a time domain.

19. The method of claim 17, wherein the signal of the transmission complex sequence is based on an equation, $$f(m) = z_{f,0}(m)e^{j2\pi k \frac{m}{N_{Tone}}},$$

and f(m) is an output of a discrete Fourier transform (DFT) precoding, k is a codeword index corresponding to the transmission bitstream, $N_{tone}$ is the length of the ZC sequence, and $z_{t,0}(i)$ is a ZC sequence generated in a frequency domain.

20. The method of claim 17, wherein the configuration information includes the length of the ZC sequence or information associated with a number of bits of the transmission bitstream corresponding to the transmission complex sequence.

* * * * *